United States Patent [19]
Brandao et al.

[11] 3,964,064
[45] June 15, 1976

[54] DATA DISPLAY SYSTEM HAVING A MULTILEVEL VIDEO STORAGE DEVICE

[76] Inventors: Ruy L. Brandao; Robert A. Taylor, Jr., both of Fort Lauderdale, Fla.; The Bendix Corporation, 02, Southfield, Mich.

[22] Filed: Nov. 21, 1973

[21] Appl. No.: 418,154

Related U.S. Application Data

[72] Continuation-in-part of Ser. No. 291,116, Sept. 21, 1972, abandoned.

[52] U.S. Cl. ............................. 343/5 SC; 343/5 DP; 343/17
[51] Int. Cl.² ........................................... G01S 7/04
[58] Field of Search .................... 343/5 DP, 5 SC, 17

[56] References Cited
UNITED STATES PATENTS

| | | | |
|---|---|---|---|
| 3,742,499 | 6/1973 | Beydler | 343/5 DP |
| 3,765,018 | 10/1973 | Heard et al. | 343/5 SC |
| 3,787,855 | 1/1974 | Cragon et al. | 343/5 DP |
| 3,810,174 | 5/1974 | Heard et al. | 343/5 DP |

*Primary Examiner*—Maynard R. Wilbur
*Assistant Examiner*—G. E. Montone
*Attorney, Agent, or Firm*—W. G. Christoforo; Bruce L. Lamb

[57] ABSTRACT

A radar return signal is analyzed by amplitude comparators so as to classify the radar return signal with respect to $2^n-1$ threshold levels to thus produce n parallel bits for each classification defining the instantaneous amplitude of the radar return signal. The bits in a given significant bit position (most significant, least significant, etc.) comprise a word which moves through the video storage device serially with respect to bits in the same significant bit position and in parallel with respect to bits in the word comprised of different significance bits. Input buffers in the form of n storage registers are provided, each storage register being associated with a particular bit significance. The bits are entered into their associated storage register at a rate dependent upon the desired radar range. The bits are optionally integrated on a bit-by-bit basis and then entered into a main memory having n circulating storage registers arranged in parallel. The information stored in the main memory is subsequently recalled and conveyed through output buffers for display on a cathode ray tube. The output buffers are comprised of n further storage registers. Each of these further storage registers is associated with a particular circulating storage register. The bits from a circulating storage register are conveyed to its associated further storage register. The bits in the output buffers are subsequently passed into a digital to analog converter, the output of the converter being applied to the cathode ray tube for display.

29 Claims, 21 Drawing Figures

| THRESHOLD EXCEEDED | | | DIGITIZED OUTPUT | |
|---|---|---|---|---|
| #1 | #2 | #3 | $V_1$ | $V_2$ |
| NO | NO | NO | 0 | 0 |
| YES | NO | NO | 1 | 0 |
| YES | YES | NO | 0 | 1 |
| YES | YES | YES | 1 | 1 |

DATA 1 = (0-3)FB2+(4-5)(FB1+FB2)+(6-11)$\overline{FB2}$+(16-17)(FB1·FB2)+(18-24)

DATA 2 = (6-11)FB2+(12-15)+(16-17)+(18-24)

| | FB2 0 | FB1 0 | FB2 0 | FB1 1 | FB2 1 | FB1 0 | FB2 1 | FB1 1 |
|---|---|---|---|---|---|---|---|---|
| 0-3 | 0 | 0 | 0 | 0 | 0 | 1 | 0 | 1 |
| 4-5 | 0 | 0 | 0 | 1 | 0 | 1 | 0 | 1 |
| 6-11 | 0 | 1 | 0 | 1 | 1 | 0 | 1 | 0 |
| 12-15 | 1 | 0 | 1 | 0 | 1 | 0 | 1 | 0 |
| 16-17 | 1 | 0 | 1 | 0 | 1 | 0 | 1 | 1 |
| 18-24 | 1 | 1 | 1 | 1 | 1 | 1 | 1 | 1 |
| | DATA 2 | DATA 1 | DATA 2 | DATA 1 | DATA 2 | DATA 1 | DATA 2 | DATA 1 |

WEIGHTS INTO DEMULTIPLEXER 160

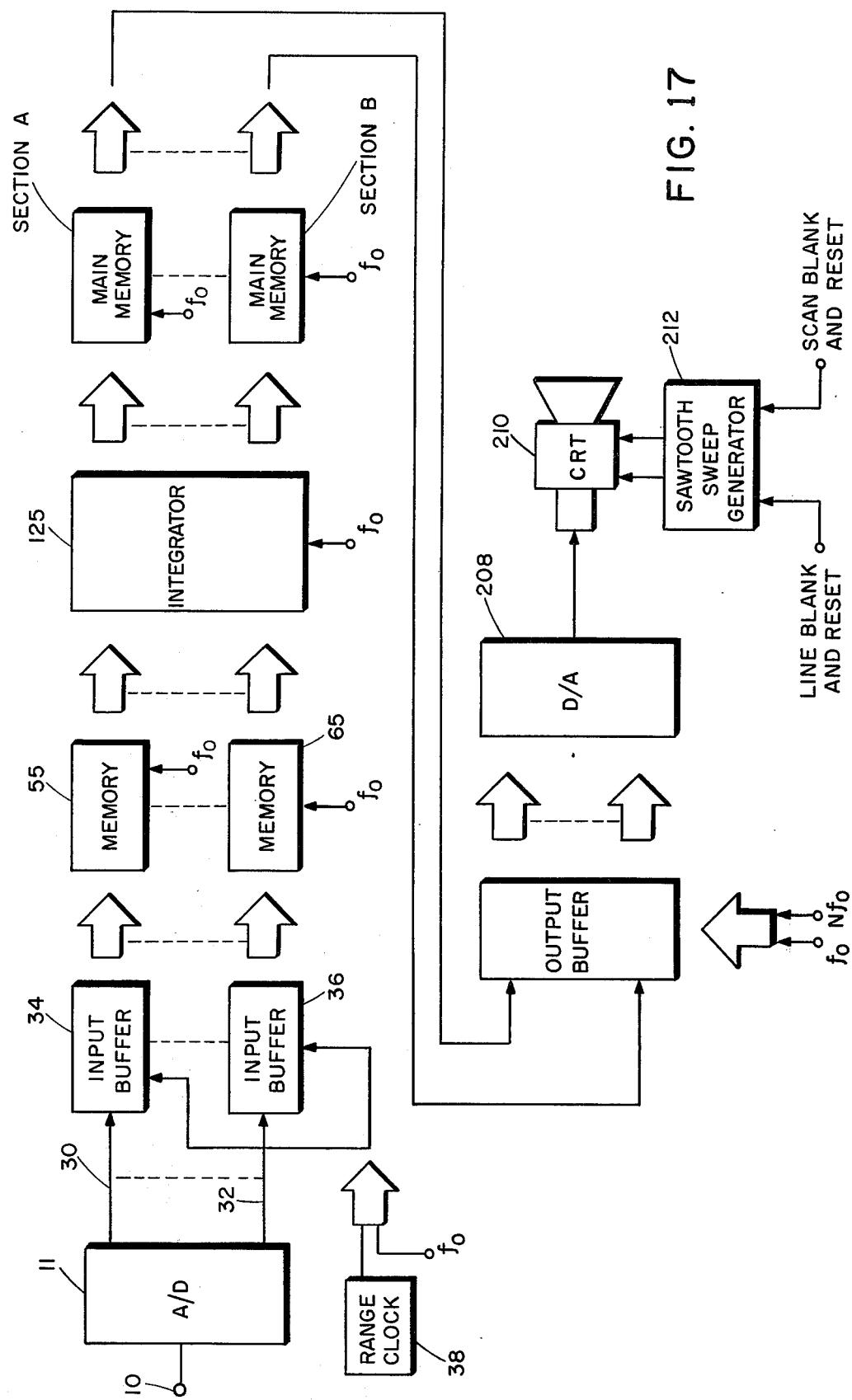

```
DATA 1 = (000) FB2 +(001)(FB1 + FB2) + (011) "1"
       +(010) FB2 +(110) "0"+ (100) (FB1·FB2)+(111) "1"

DATA 2 = (000) "0" + (001) "0"+(011) "0"+ (010) FB2
       +(110) "1"  +(100) "1" + (111) "1"
```

DATA DISPLAY SYSTEM HAVING A MULTILEVEL VIDEO STORAGE DEVICE

This application is a continuation in part of Patent Application Ser. No. 291,116 now abandoned, filed Sept. 21, 1972.

CROSS REFERENCE TO RELATED APPLICATIONS

This application discloses and claims an improvement to the data display system of Patent Application Ser. No. 226,899 now U.S. Pat. No. 3,803,600, filed Feb. 16, 1972, entitled "Digital Sweep Generator and Video Storage Device for a Data Display System" by the inventors of the present application and assigned to the same assignee.

BACKGROUND OF THE INVENTION

This invention relates to improvements in data display systems which are adapted for use with radar indicators and video storage devices therefor of the type wherein data is received at a relatively low rate and displayed at a different rate, generally many times faster, to obtain a relatively non-flickering steady high resolution image and where the high resolution image has multiple intensity levels. The invention has particular application in weather radar systems and radar navigation systems.

It has long been a desirable feature that the indicator for the above type radars provide a continuous bright display of video information which will appear as a moving map to the pilot. This desirable feature has been closely approximated in the past by storage tube indicators. Storage tubes, however, require careful design for stable operation. The small spacing and relatively high voltage existing between the storage mesh and the viewing phosphor are vulnerable to breakdown. Operation of the tube must be controlled to prevent a bistable condition on the storage surface. In this condition, excessive beam writing can shift the storage mesh potentials sufficiently to result in secondary emission, causing a runaway condition and resulting destruction of the viewing screen mesh.

A digital display system which provided the desired continuous bright display of video information was described in the above mentioned prior related patent application. It was explained in that application that a radar return signal was converted into a train of binary bits and the bits were temporarily stored in an input buffer at a rate determined by the desired radar range. The bits were subsequently entered from the input buffer into a circulating memory where the bits were stored. The memorized bits were optionally integrated to eliminate extraneous signals, such as those caused by noise or other interference. An output buffer was provided between the memory and the cathode ray tube to permit selected portions of the memorized bits to be displayed in an ordered sequence on the cathode ray tube at a rate which may differ from the rate at which bits were entered into the input buffer. This method of sweep generation and storage permits the quality of the display to be independent of the pulse repetition frequency of the system. Therefore, a minimum pulse repetition frequency can optionally be used and still retain a relatively bright, continuous display. As a result, the average power consumed by the transmitter portion of the radar system could be much less than that required by systems having a higher pulse repetition frequency.

In addition to the above described elements, means were described for synchronizing the operation of the input and output buffers and their associated gates with the radar antenna position.

In the system described in the previous application, there was no transformation of the coordinate system. The input data from the radar receiver was in the rho-theta coordinate system and the resulting display was in the rho-theta coordinate system. However, the rates of input and output data were optimally independent.

The digital display system described in the aforementioned prior patent application has provisions for storing and subsequently displaying the information contained in a single train of serial binary bits. In other words, the resultant display was merely a twolevel display wherein one level corresponded to a logical 0 or no radar return or return below a certain threshold and a second level corresponded to a logical 1 or a radar return above the threshold.

It has been found useful to have multiple intensity levels (multilevel) displays, especially for weather radar. For example, a four level display might have a first level at which no radar return is received indicating the radar transmission has not intercepted inclement weather conditions. A second level might indicate that the returned radar signal exceeds a first threshold indicating that minor inclement weather conditions have been intercepted by the radar transmission. In like manner, third and fourth levels might indicate that successively severe weather conditions have been intercepted by the radar transmission. Using this type of weather radar there can be presented on the radar display areas of intense storm condition, called storm cells, with areas of lesser storm activity between the storm cells. An airplane pilot having this type of weather radar would then be able to maneuver his aircraft through these areas of lesser storm intensity. Of course, if a display system having only two levels were used, the pilot would be unable to distinguish areas of lesser storm activity from storm cells to the detriment of his maneuvering ability.

SUMMARY OF THE INVENTION

Accordingly, a digital display system has been improved to provide in excess of two levels of display information. This is accomplished by applying the analog video signal corresponding to the radar return signal to amplitude comparators having multiple thresholds. The output from the comparators will comprise multiple parallel trains of binary bits. Each of these trains is separately stored through parallel stages of an input buffer into parallel operating circulating memories. The pulse trains are individually recalled from the circulating memory through an output buffer comprised of parallel stages and the trains are applied from the output buffer to a digital to analog (D/A) converter where the original analog video is restored for application to a cathode ray tube.

As in the prior system an azimuth memory is provided which is updated at a rate related to the pulse repetition frequency of the radar. A source of various coherent frequencies is also provided which together with an azimuth locater maintains the various pulse trains synchronous with one another and synchronizes the operation of the input and output buffers and their access with the circulating memory and the A/D converter. Three embodiments of the invention are shown: a coherent form wherein the radar antenna and transmissions are controlled by the display system logic circuits; a non-coherent form wherein the radar antenna position and radar transmissions are independently controlled; and a further alternate embodiment which may be of the coherent or non-coherent type having an advanced integrator.

It is thus an object of this invention to provide a radar indicator which employs digital techniques for video storage and for controlling radar sweep generation.

It is another object of this invention to provide a data display system for a radar which will supply a continuous bright display of video information.

It is still a further object of this invention to provide a radar indicator which is particularly advantageous for use with airborne weather radars.

One more object of this invention is to provide a digital radar indicator for use with a radar which operates with reduced power consumption.

A still further object of this invention is to provide a radar indicator of the type described which has multiple display levels.

BRIEF DESCRIPTION OF THE DRAWINGS

FIG. 17 is a simplified block diagram which illustrates the invention.

Figures 1, 2:
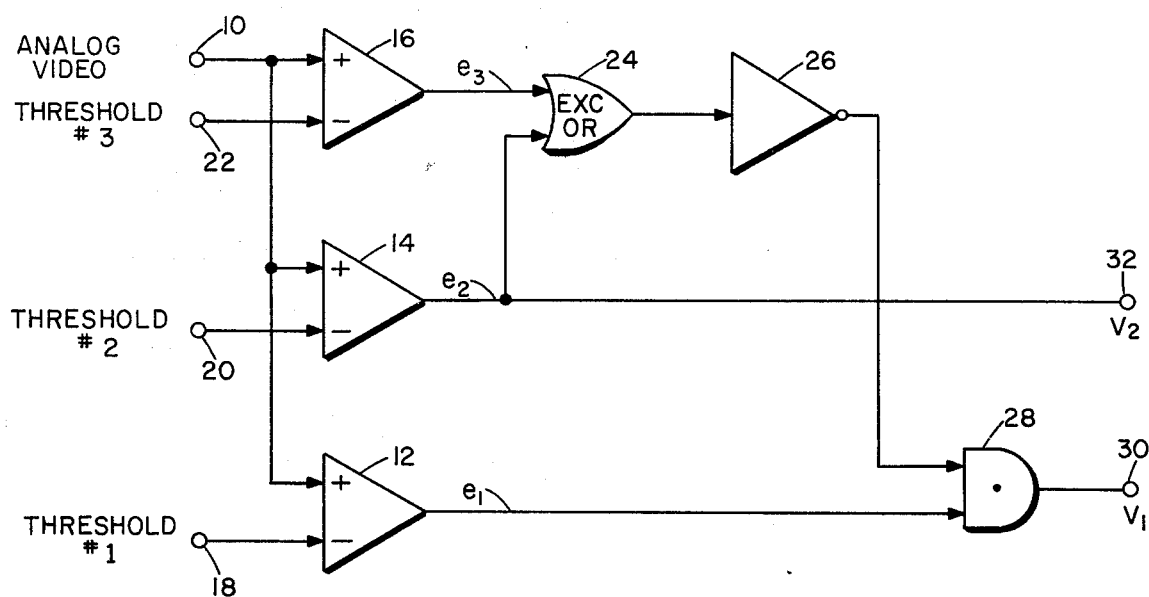
FIG. 1 is a block diagram of amplitude comparators used to convert an analog video signal into multiple binary trains.
FIG. 2 is a truth table useful in explaining the operation of the comparators of FIG. 1.

In this description, a word, range word, binary or digital word, is defined as a serial train of binary bits which comprise one range line of information. All words are the same length and in particular are made 128 bits in length. This length allows the economical use of commerically available MOS integrated circuits. Each memory to be described includes storage for an integral number of words.

Referring to the figures wherein like numbers refer to like items, and more particularly referring to FIG. 17, there is seen an input terminal 10 upon which analog video data is impressed. The means for obtaining analog video data are well known to those skilled in the art and need not be described at this time. The video comprises the radar return intercepted by a radar receiver. The analog video signal is suitably impressed on terminal 10 at the rate the radar return is intercepted by the radar receiver. Terminal 10 is suitably connected to an analog to digital converter wherein the analog radar return signal is digitized. In the embodiment to be described the analog radar return signal is digitized into two binary bits resulting in, of course, a binary signal having four possible levels. It should be obvious as this description proceeds, that it is possible to provide a data display system of this type having a different number of display levels by providing additional elements parallel to those to be described. In any event, for the embodiment being described, the binary signal output from converter 11 is connected via lines or terminals 30 and 32 to input buffers 34 and 36. Digital data corresponding to and describing a radar return signal is strobed into the input buffers by a clock signal of a predetermined number of bits for each radar return and of a pulse repetition frequency which depends on the desired radar range as will also be more fully described below. This clock signal is obtained from a range clock 38 the proper time after the radar set transmits a radar pulse. The large arrow issuing from range clock 38 represents, here and elsewhere in FIG. 17, various gates for switching signals in proper time sequence through the various elements of the embodiment. An embodiment of these gates together with the time sequencing will also be described in greater detail below.

Memories 55 and 65 receive the digital signals previously stored in buffers 34 and 36 at a clock frequency $f_o$, which is the basic information rate of the system. Memories 55 and 65 preferably are able to store a plurality of radar return signals. The memories periodically communicate their contents with an integrator 125 wherein the radar return signals are considered with respect to adjacent returns and previous returns to remove noise and other anomalies.

Integrator 125 enters the results of its integrations into main memories, sections A and B wherein, suitably, the radar returns of all or most of an antenna scan are stored. It should be noted that information in memories 55 and 65, integrator 125 and main memory sections A and B moves therein at the basic information rate $f_o$.

Referring now to FIG. 1 it is seen that terminal 10, which is also seen in FIG. 17 is connected to the non-inverting input terminals of operational amplifiers 12, 14 and 16 each of which is individually connected as a comparator. Three voltage levels from a source not shown comprise thresholds No. 1, 2 and 3 where threshold No. 1 is at a relatively low voltage, threshold No. 2 is at an intermediate voltage, and threshold No. 3 is at a relatively high voltage. Thresholds No. 1, 2 and 3 are applied respectively to terminals 18, 20 and 22, which are connected individually and respectively to the inverting input terminals of the operational amplifiers 12, 14 and 16. If the analog video applied to a comparator exceeds the threshold applied to that comparator, the comparator generates a relatively high output signal. These output signals are designated as $e_1$, $e_2$ and $e_3$, respectively. The output from comparator 12 is connected as one input to AND gate 28. The output from comparator 14 is connected directly to output terminal 32 and is additionally connected together with the output from comparator 16 as inputs to exclusive OR gate 24. The output from the exclusive OR gate is connected through inverter 26 to the second input of AND gate 28. The output signal from the AND gate is connected to a second output terminal 30. A resultant signal at terminal 30 is termed a $V_1$ signal and comprises the least significant bit while the resultant signal at terminal 32 is termed the $V_2$ signal and comprises the most significant bit. Of course, if the analog video signal does not exceed the threshold of a particular comparator that comparator output is relatively low or a logical 0 signal.

Refer now also to FIG. 2 which is useful in explaining the operation of the circuit of FIG. 1. Assume first that the incoming analog video signal is relatively low so that it exceeds none of the thresholds. Thus, the $e_1$, $e_2$ and $e_3$ signals will be logical 0 so that AND gate 28 will remain closed and a logical 0 will appear at terminal 30 and the logical 0 from comparator 14 will appear at terminal 32 If the analog video signal exceeds threshold No. 1 but is lower than thresholds No. 2 and 3 then the $e_1$ signal will be a logical 1 while $e_2$ and $e_3$ will be logical 0's. Accordingly, the signal at terminal 32 will be a logical 0 while the output from exclusive OR gate, which in this case is a logical 0, will be inverted by inverter 26 to produce a logical 1 which together with the $e_1$ signal which is now a logical 1 will open gate 28 to apply a logical 1 at terminal 30. If thresholds No. 1 and 2 are exceeded $e_1$ and $e_2$ will be at the logical 1 level while $e_3$ will be a logical 0. In this case, the output from gate 24, which is now a logical 1, is inverted by inverter 26 and used to maintain gate 28 closed so that a logical "0" appears at terminal 30. However, the logical 1 output from comparator 14 is applied directly to terminal 32. In the case where the analog video signal exceeds all thresholds each comparator output goes to the logical 1 level so that the output from exclusive OR gate 24 is a logical 0, this signal being inverted by inverter 26 qualifies gate 28 so that the logical 1 output from comparator 12 now appears at terminal 30. The logical 1 output from comparator 14 appears at terminal 32.

Of course, as the analog video signal at terminal 10 varies from some level below threshold No. 1 to some level above threshold No. 3, the resultant signals at terminals 30 and 32 will vary in accordance with the truth table of FIG. 2. It now remains to sample the signal at terminals 30 and 32 at some clock rate in order to produce two individual trains each comprised of a serial train of binary bits, with the two trains running parallel with respect to one another.

Figure 3:
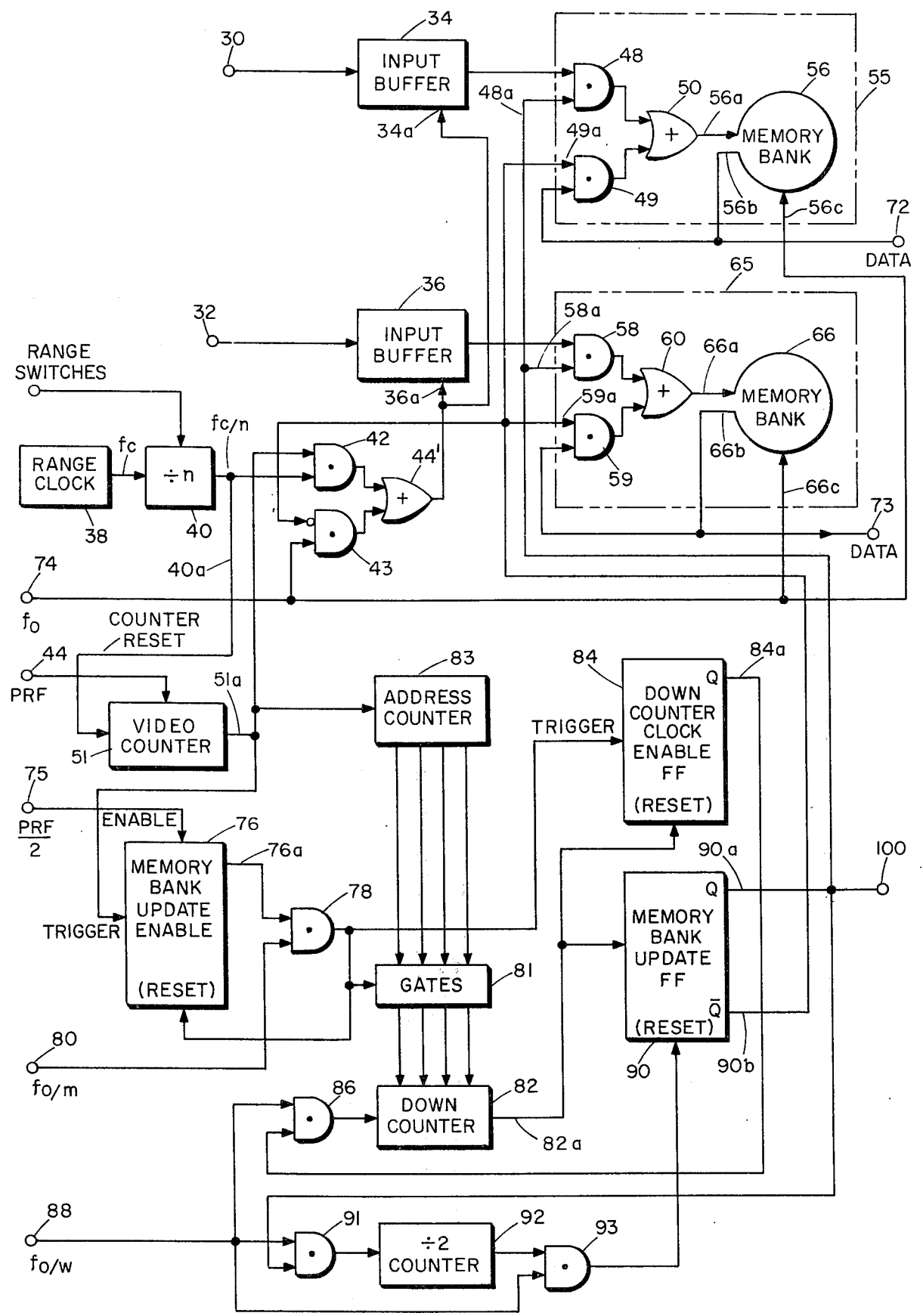
FIG. 3 is a block diagram which illustrates the input section of the invention.

Refer now to FIG. 3 where there are seen terminals 30 and 32 which are also seen in FIG. 1. Terminal 30 is connected to the input terminal of input buffer 34 while terminal 32 is connected to the input terminal of input biffer 36. The input buffers in this embodiment are each comprised of two 128 bit shift registers and thus each is capable of receiving and storing therein two binary words from their respective input terminals. The binary words are clocked into the input buffers by clock pulses applied respectively to terminals 34a and 36a.

Clock pulses having a repetition frequency of $f_c$ are supplied by a range clock 38 to a divide-by-n counter 40 which in response thereto supplies clock pulses at a repetition frequency of $f_c/n$. These latter clock pulses are applied through AND gate 42, if opened, and OR gate 44' to terminals 34a and 36a to strobe the binary signals on terminals 30 and 32, respectively, into input buffers 34 and 36. The clock pulses at $f_c/n$ are also applied by a line 40a to a video counter 51 which accumulates these pulses and generates an output signal on line 51a so long as counter 51 is not filled. Counter 51 fills after it has accumulated the number of clock pulses equal to the number of bits in a word, that is, the counter in this embodiment has a capacity for accumulating 128 counts. In addition, counter 51 is reset by the pulses in a pulse train having a pulse repetition frequency (PRF) of the radar with which this system is used and is reset at the time the radar transmitter transmits a pulse. This pulse train is herein termed the PRF signal and appears at terminal 44. In the coherent form of the invention, this PRF signal is derived from the means for generating the control signals. In the non-coherent form of the invention, the PRF signal is obtained from the radar transmitter and is non-coherent with respect to the other control signals. Thus, in either form of the invention, video counter 51 is reset to a zero count so that it generates an output on line 51a to qualify AND gate 42 simultaneously with the expected arrival of the signals at terminals 30 and 32 which correspond to the radar return from this particular transmission. Since the same pulse train is applied simultaneously to video counter 51 and to AND gate 42, exactly 128 clock pulses at repetition frequency $f_c/n$ will pass through the AND gate and through OR gate 44 onto terminals 34a and 36a to thus enter exactly one binary word into each input buffer 34 and 36 with each radar transmission. The binary words entered into input buffer 34 are the least significant words whereas the binary words entered into input buffer 36 are the most significant words. The two words taken together describe the return from a single radar transmission.

The factor n of divider 40 is variable, in a manner well known to those skilled in the art, by manipulation of range switches, not shown, to change the rate at which the input buffers are strobed, that is, to vary the rate at which logical bits from terminals 30 and 32, respectively, are entered into the input buffers. Since the binary signals at terminals 30 and 32 are changing at the rate the radar receiver intercepts the radar return it should be obvious that the frequency of the clock pulses at terminals 34a and 36a determine the range at which each individual bit of a word is entered into the input buffers. A first memory 55 is comprised of a memory bank 56, AND gates 48 and 49 and OR gate 50. Memory bank 56 is a dynamic circulating memory and has the capacity to store therein an integral number of 128 bit words and thus comprises the required number of MOS integrated circuit dynamic shift registers. In this particular embodiment, memory bank 56 has the capacity to store 1024 bits, that is, eight words of 128 bits each. Of course, the capacity of this circulating memory as well as the capacity of other circulating memories disclosed herein is a design option as will become obvious as the description proceeds. Binary information enters memory bank 56 at terminal 56a and exits from the memory bank at terminal 56b. The rate at which the binary bits circulate is determined in the manner well known to those skilled in the art by the rate at which clock pulses are applied to terminal 56c. These clock pulses are continuously supplied at a pulse repetition frequency of $f_0$ from a source which will be shown later. These latter clock pulses are also applied to terminal 66c of another memory bank 66 which together with AND gates 58, 59 and OR gate 60 comprise a second memory 65 which is essentially identical to memory 55. Note particularly that the qualifying input terminal 49a of AND gate 49 is connected in common with the qualifying input terminal 59a of AND gate 59. Thus, AND gates 49 and 59 are qualified simultaneously. If AND gates 49 and 59 are qualified, the binary bits exiting from its associated memory bank 56 or 66, respectively, at terminal 56b or 66b are immediately entered through the gate and through the associated OR gate 50 or 60 back into the memory bank at terminal 56a or 66a, thus providing continuous storage within a memory bank so long as gates 49 and 59 are qualified. Memory bank information is also available at the respective data terminals 72 and 73 as it exits at terminal 56b or 66b, respectively. Note also that qualifying input terminal 48a of gate 48 is connected in common with qualifying input terminal 58a of gate 58. Thus, these latter two gates will be qualified simultaneously. Memories 55 and 65 are updated by closing gates 49 and 59 and qualifying gates 48 and 58 while simultaneously strobing the information from the input buffers through gates 48 and 50 onto terminal 56a for the information contained in input buffer 34 and through gates 58 and 60 onto terminal 66a for the information contained in input buffer 36. Of course, when memories 55 and 65 are updated, pulses $f_0$ rather $f_c/n$ must be supplied at the input buffer terminals 34a and 36a so that the binary data stored therein may be entered into the memory banks at the same rate the bits within the memory banks are circulating In the embodiment shown, two consecutive digitized video words comprising two consecutive range lines are entered into each input buffer 34 and 36 from terminals 30 and 32, respectively, and then immediately transferred into memory banks 56 and 66. A range line is defined as the return from an individual radar transmission. In an indicator actually built, frequency $f_0$ was 828 KHz. Since 256 clock pulses are required to enter the two words temporarily stored in each input buffer into the memory banks, it can be seen that this operation requires approximately one third of a millisecond. As previously discussed, the time required to store the signals at terminals 30 and 32 into the input buffers is directly related to the distance selected for viewing. For example, the time to enter the data into the input buffers for a 200 mile range display is approximately 2.4 milliseconds. The frequency $f_c/n$ would thus be 128 bits divided by 2.4 milliseconds or 53 KHz. In like manner, the time to enter the data for a fifty mile range display is approximately 0.6 milliseconds. Thus, assuming that a 200 mile range display is the maximum range to be handled in this particular embodiment and assuming further that the pulse repetition frequency of the radar transmitter is about 200 per second, or a period of approximately 5 milliseconds, it can be seen that there is sufficient time after the storage of a particular word into an input buffer for both words temporarily stored in the two input buffers to be subsequently transferred to the memory banks before the next transmission occurs.

The updating of the memory banks is accomplished as follows. There is impressed upon terminal 75 a square wave having a pulse repetition frequency which is one-half the radar transmitter pulse repetition frequency so that two radar transmissions are made during one period of the square wave. This square wave is termed the PRF/2 signal. The high portion of the square wave energizes the memory bank update enable flip-flop 76. This flip-flop is subsequently triggered by the negative going transitions on line 51a from video counter 51. Hence, at the termination of the second word stored into the input buffers flip-flop 76 is triggered so that an output signal appears on terminal 76a to thus qualify AND gate 78.

There is impressed on terminal 80 from a source to be shown later, a train of pulses at a pulse repetition frequency of $f_0/m$ where $m$ is equal to the number of bits in either memory bank. This signal is termed the $f_0/m$ signal. With gate 78 now qualified a pulse from the $f_0/m$ signal passes therethrough to open gate 81 to gate the contents of address counter 83 into down counter 82. In addition, the signal from gate 78 also toggles down counter clock enable flip-flop 84 so that a signal is generated at terminal 84a which is used to qualify AND gate 86. The signal from gate 78 is also used to reset flip-flop 76 thus closing gate 78. Thus, only a single pulse from terminal 80 passes through gate 78 each time it is qualified.

A terminal 88 has a train of pulses having a pulse repetition frequency of $f_0w$, where $w$ is the number of bits in a word, impressed thereon. This signal is termed the $f_0/w$ signal. Pulses from the $f_0/w$ signal pass through gate 86 when that gate is qualified to clock down counter 82.

Address counter 83 whose contents have been entered in the down counter 82, accumulates the negative going transitions from line 51a and hence contains a number related to the memory bank word location for the words received by input buffers 34 and 36. For proper operation of the embodiment being described, address counter 83 should be a divider which divides the negative going transitions on line 51a by a number C where C is equal to the word storage capacity of either memory bank less the number of words entered therein each time the memory bank is updated. Since in this embodiment two words are entered from each input buffer into each memory bank each time the memory banks are updated and the capacity of each memory bank is eight words, then $$C = 8-2 = 6.$$

When down counter 82 is clocked down to zero, it generates an output on line 82a which resets flip-flop 84 to extinguish the signal on line 84a to thus close gate 86. In addition, the signal on line 82a toggles the memory bank update flip-flop 90 which thereafter generates a signal at line 90a and extinguishes the signal at line 90b. Line 90a communicates with gates 48 and 58 thus qualifying those gates. Line 90b communicates with an inhibiting port on gate 43 and further communicates to ports 49a and 59a of gates 49 and 59, respectively. The clock pulses $f_0$ from terminal 74 now pass through gates 43 and 44 to terminals 36a and 34a of input buffers 36 and 34, respectively, to thus clock the binary words stored therein through now qualified gate 48 and 58 and gates 50 and 60, respectively, into memory banks 56 and 66. At the same time, since gates 49 and 59 are now closed, two words previously stored in each memory and issuing respectively at terminals 56b and 66b are extinguished. The pulses $f_0/w$ are applied through the now qualified gate 91 to a divide-by-2 counter 92. At the conclusion of the second $f_0/w$ pulse following the setting of flip-flop 90, counter 92 generates an output which opens gate 93 to thus reset flip-flop 90. This action causes the latter flip-flop to generate a signal at port 90b and to extinguish the signal at line 90a. Thus, exactly two binary words will be strobed from each input buffer into its associated memory bank at the completion of which gate 43 will close and gates 49 and 59 will open. In this condition, the information stored in each memory bank will continue to circulate therein and will be preserved in response to the pulses continuously received at terminals 56c and 66c.

Figure 4:
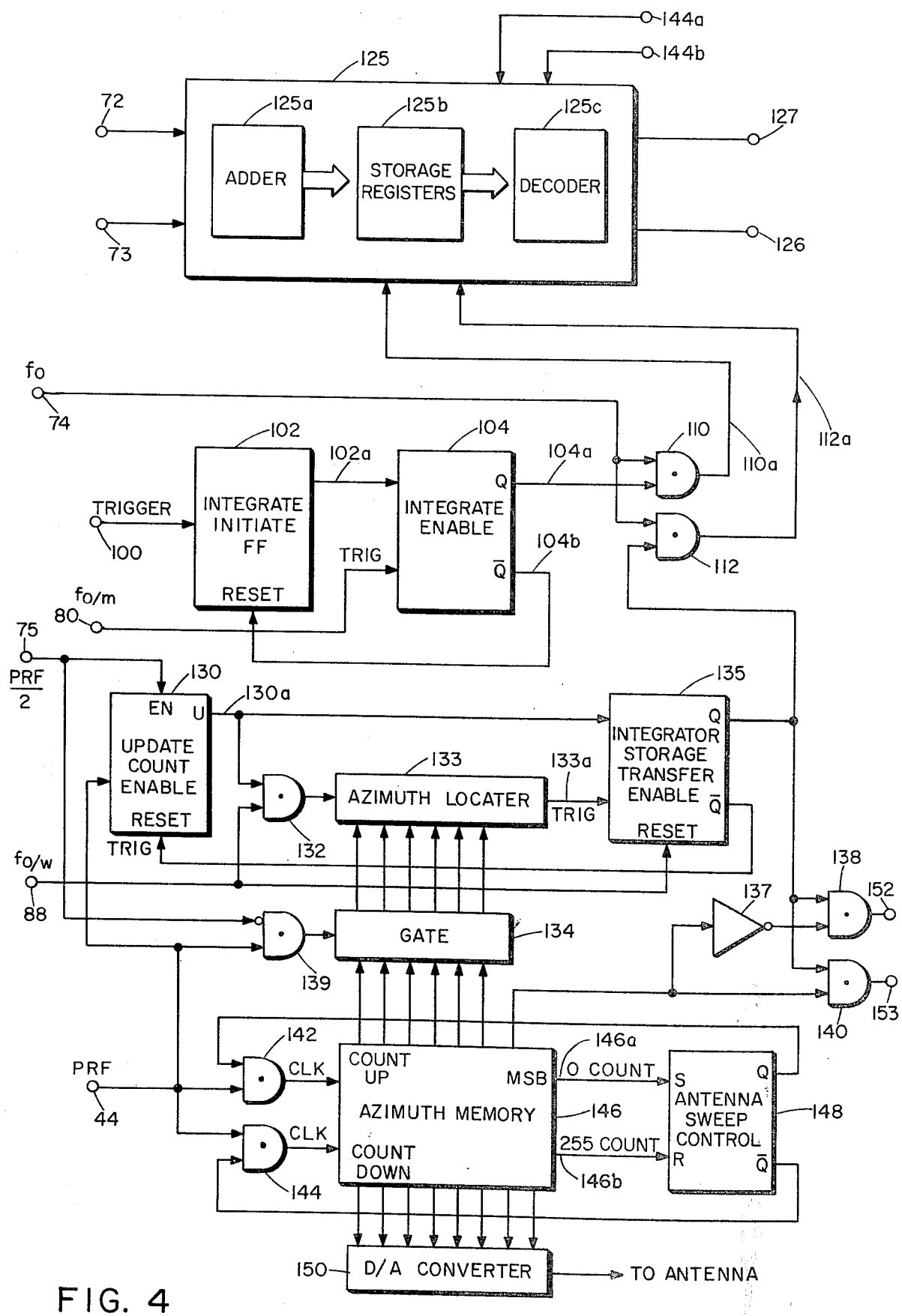
FIG. 4 is a block diagram which illustrates an integrator and associated elements used with the invention.

Refer now to FIG. 4 which shows binary data integrator 125 having the data input terminals 72 and 73 previously seen in FIG. 3 connected as input thereto. The integrator output appears at terminals 126 and 127 with the least significant data appearing at terminal 126 and the most significant data appearing at terminal 127. Use of the integrator is optional with the system designer and it operates to remove extraneous signals, such as those caused by noise or other interference from the radar return binary data passing therethrough. The integrator performs its function by summing the entire contents of the various memory banks 55 and 65 and comparing the results of such summation with feedback from portions of the contents of main memory which is to be updated. This operation will be shown in greater detail below. Feedback from the main memory is received at input terminals 144a and 144b. The integrator operates in response to $f_0$ signals applied through the gating means comprised of gates 110 and 112 to lines 110a and 112a, respectively.

Integrator 125 is comprised of an adder 125a, storage registers 125b and a decoder 125c. The integrator operates to examine all the bits stored in the memory banks on a bit-by-bit basis to produce parallel words at terminals 126 and 127 for entry into a main memory to be described. For example, the integrator examines the first bit of each word stored in the memory banks and enters a binary one into the storage registers corresponding to the number of times the first bit of each least significant word stored in the memory banks is of a predetermined logic, such as logic 1, plus a binary 2 each time the first bit of each most significant word is a logic 1. In like manner the integrator examines the subsequent bits of each word stored in the memory banks and enters a corresponding number into integrator storage registers 125b.

In the embodiment being described it is assumed that eight words are stored in each memory bank, that is, each memory bank has a capacity for storing 1024 binary bits. Integrator storage registers 125b must have a capacity of storing a number corresponding to weight 24 for each bit position in a word. Thus, the storage registers 125b suitably consists of five shift registers each of which has a capacity of 128 bits. During the summation portion of the integration period, that is, the time during which the contents of the memory banks are entered into the storage registers as described above, exactly 1024 clock pulses are supplied by gate 110 to the integrator. These 1024 clock pulses correspond to the 1024 bit capacity of each memory bank and operate to sample the total contents of the memory banks.

Figures 5, 7, 8:
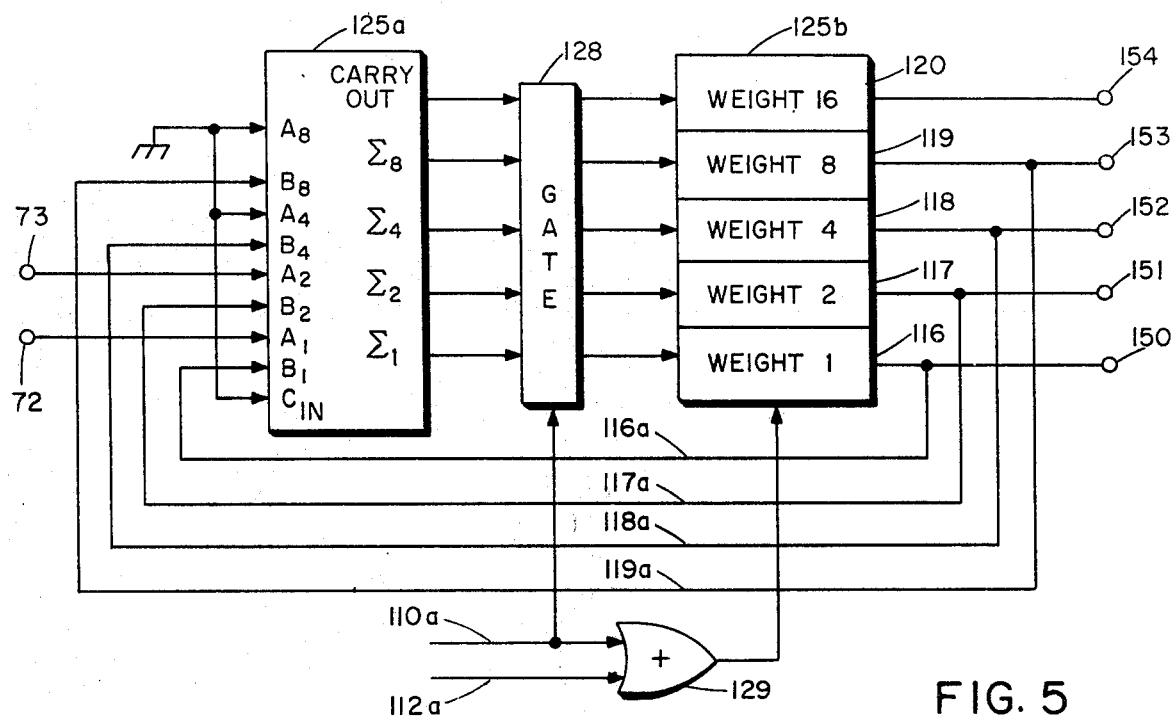
FIG. 5 is a block diagram which shows the summing portion of the integrator in greater detail.
FIGS. 7 and 8 show the logic equation and truth table respectively which define the operation of the integrator.

Refer now to FIG. 5 which shows integrator 125 of FIG. 4 in greater detail and where there are seen terminals 72 and 73 which are also seen in FIGS. 3 and 4. These terminals are connected to the adder 125a with terminal 72 being connected to the $A_1$ adder input and terminal 73 being connected to the $A_2$ adder input.

Storage register 125b is comprised of five shift registers 116 to 120 having weights of 1, 2, 4, 8 and 16, respectively. Each shift register has a storage capability of 128 binary bits, which, of course, is one word in length. Binary data is strobed into the storage registers by clock pulses at line 110a which are applied through OR gate 129 simultaneously to all shift registers. In addition, the pulse on line 110a opens gate 128. Information strobed into the shift registers is obtained from adder 125a where the binary data at terminals 72 and 73 is summed with the sum accumulating in the storage register 125b during the summation portion of the integration period. This accumulated sum is fed via line 116a from shift register 116 to the $B_1$ input terminal of adder 125a and also via lines 117a, 118a and 119a from shift registers 117, 118 and 119, respectively, to the adder input terminals $B_2$, $B_4$ and $B_8$. The adder performs the function of adding the bits at terminals $A_n$ and $B_n$ and entering the results through now opened gate 128 into the shift register having a weight of $n$ where $n$ is equal to 1, 2, 4 or 8 in accordance with the following formulas:

$$A_1 + B_1 + C_{1n} = \Sigma_1 + \text{Carry } 1$$
$$\text{but } C_{1n} = 0$$
$$\text{thus } A_1 + B_1 = \Sigma_1 + \text{Carry } 1$$
$$A_2 + B_2 + \text{Carry } 1 = \Sigma_2 + \text{Carry } 2$$
$$A_4 + B_4 + \text{Carry } 2 = \Sigma_4 + \text{Carry } 4$$
$$\text{but } A_4 = 0$$
$$\text{thus } B_4 + \text{Carry } 2 = \Sigma_4 + \text{Carry } 4$$
$$A_8 + B_8 + \text{Carry } 4 = \Sigma_8 + \text{Carry } 8$$
$$\text{but } A_8 = 0$$
$$\text{thus } B_8 + \text{Carry } 4 = \Sigma_8 + \text{Carry } 8$$
$$\text{Carry } 8 = \text{Carry Out}$$

It should be noted, as will be explained below, that prior to the beginning of the summation portion of the integration period the storage registers 125b will be set to zero.

Of course, during the integration period the information issuing from the various shift registers for use by adder 125a will also appear simultaneously at terminals 150 to 154. It will be shown below that the information appearing on these output terminals during the integration period does not affect the operation of the system. However, subsequent to the integration period it will be shown that an additional 128 clock pulses will be applied on line 112a which will strobe the information contained in the storage registers to the terminals 150 to 154 for use by the decoder. At the same time gate 128 is closed thereby interrupting communication between adder 125a and the storage registers 125b. At the completion of these last 128 clock pulses on line 112a the storage registers will have been set to zero.

Figure 6:
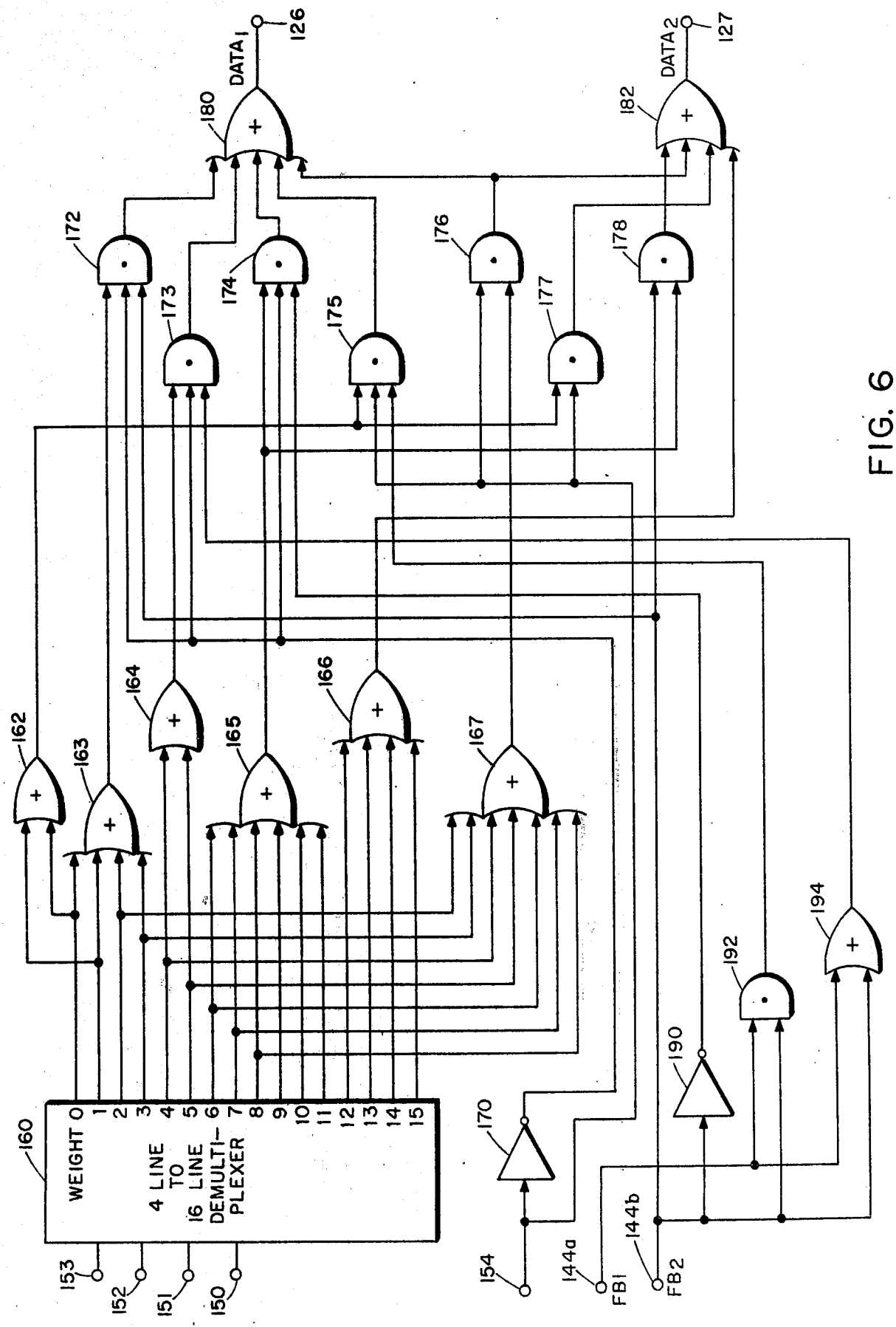
FIG. 6 is a block diagram which shows the decoder portion of the integrator in greater detail.

Refer now to FIG. 6 wherein there is seen terminals 150 to 154 previously seen in FIG. 5. Terminals 150 to 153 are connected to a 4-line to 16-line demultiplexer of the type which generates an output on only 1 line of a possible 16 lines in accordance with the signals applied to the input terminals. These output lines represent a weight of 0 to 15, respectively. For example, if all binary 0's are applied to the input terminals the output signal will appear on the line having a weight of 0. As another example, if a logic 1 is applied at terminal 153, that is at the input terminal having a weight of 8, and logic 0's are applied at the other input terminals the output line having a weight of 8 will have an output signal appearing thereon. As one more example, if all input terminals have a logic 1 applied thereto the output signal will appear on the output line having a weight of 15. Demultiplexers of this type are commercially available, for example, the demultiplexer T174154 is available from Texas Instruments, Inc. of Dallas, Texas.

The demultiplexer output lines having weights of 0 and 1 are applied to the input of OR gate 162, while the output lines having weights of 0 to 3 are applied to OR gate 163. The output lines having weights of 4 and 5 are applied to OR gate 164, the output lines having weights of 6 to 11 are applied to OR gate 165, the output lines having weights of 12 to 15 are applied to OR gate 166 and the lines having weights of 2 to 8 are applied to OR gate 167.

The information issuing from shift register 120 of FIG. 5, that is the shift register having a weight of 16, which appears at terminal 154, is applied to an inverter 170 so that the output of the inverter is a logical 0 when the inverter input is a logical 1. The inverter output is applied as inputs to AND gates 172 through 174. The other OR gates are interconnected with the AND gates 172 through 178 as shown. The output from AND gates 172 to 175 are applied as inputs to OR gate 180, while the output from AND gates 177 and 178 are applied as inputs to OR gate 182. In addition, the output from AND gate 176 is applied to both the OR gates 180 and 182.

As previously mentioned, feedback from the main memory is applied at terminals 144a and 144b. The logic states of the exact bits in the main memory being updated appear simultaneously at the terminals 144a and 144b with the formulation of the updating bits which appear at terminals 186 and 187. The data at terminal 144b is connected through inverter 190 to an input terminal of AND gate 174, while the terminals 144a and 144b are applied as inputs to AND gate 192 and as inputs to OR gate 194. The output from gate 192 is applied as an input to AND gate 175, while the output from gate 194 is applied as an input to AND gate 173.

The various gates in demultiplexer 160 are interconnected to produce the logic equations of FIG. 7, reference to which figure should now be made. Reference should also be made to FIG. 8 which shows in tabular form the results of the equations of FIG. 7. In these figures Data 1 and Data 2 refer to the signals appearing respectively at terminals 186 and 187 of FIG. 6, where Data 1 exists when a logical 1 appears at terminal 186 and Data 2 exists when a logical 1 appears at terminal 187. FB1 and FB2 refer to the feedback signals at terminals 144a and 144b, respectively. As before, the feedback signal exists when a logical 1 appears at its respective terminal. The figures in parentheses in the equation of FIG. 7 refer to the signal weight inputs to demultiplexer 160.

In particular, a logical 1 appears at terminal 186 when the signal weight input at demultiplexer 160 is between 0 and 3 and the feedback signal at terminal 144b is a logical 1 or the signal weight is 4 or 5 and there is a logical 1 feedback at either terminal 144a or 144b or the signal weight is between 6 and 11 and there is a logical 0 at feedback terminal 144b or the signal weight is 16 or 17 and there is a logical 1 feedback at both terminals 144a and 144b or the signal weight is between 18 and 24. Otherwise a logical 0 appears at terminal 186. A logical 1 appears at terminal 187 if the input signal weight is between 6 and 11 and a logical 1 appears at terminal 144b or the input signal weight is between 12 and 24. Otherwise a logical 0 appears at terminal 187.

It now remains to be explained how the 1024 clock pulses at the $f_0$ frequency are first applied at line 110a to thereby perform the summation portion of the integration and subsequently 128 pulses at the $f_0$ frequency are applied at line 112a to perform the decoding portion of the integration. The block diagram for programming these frequencies is seen in FIG. 4, reference to which should again be made. In this figure the $f_0$ clock frequencies are applied at terminal 74, the $f_0/m$ frequencies at terminal 80 and the $f_0/w$ signals at terminal 88. These various signals are coherent with one another and are preferably generated from the same digital source of the type which will be described below. The PRF/2 signals are applied at terminal 75. These latter signals may be coherent or non-coherent with respect to the other signals as will be explained below. In addition to the above signals the PRF signal is applied at terminal 44. The PRF signal may also be coherent with the above signals or optionally may not be coherent therewith. There is also seen a terminal 100 which communicates with the toggle terminal of integrate initiate flip-flop 102. It will be remembered that a signal appears at terminal 100 at the beginning of the updating of memory banks 56 and 66. The trailing edge of this signal at the conclusion of the aforementioned update of the memory banks sets flip-flop 102 so that a signal appears at the output 102a thereof which is applied to the set terminal of flip-flop 104. The toggle terminal of this latter flip-flop is connected to terminal 80, upon which it will be remembered the frequency signal $f_0/m$ is impressed. Thus, upon the appearance of a pulse from this signal, flip-flop 104 goes to the set state to generate a signal at terminal 104a and to extinguish the signal in 104b. The signal at terminal 104a qualifies AND gate 110 thus permitting the signal $f_0$ at terminal 74 to pass therethrough to integrator 125. Gate 110 remains open until a subsequent signal appears at terminal 80 to trigger flip-flop 104 into the reset state whereupon the signal at line 104a is extinguished and the signal at line 104b is again generated. It will be remembered that with respect to the signal $f_0/m$, $m$ is equal to the number of bits stored in either memory bank 56 or 66, that is, $m$ is equal to 1024. Thus, gate 110 will be opened for exactly 1024 clock pulses at the $f_0$ frequency as required to perform the summation portion of the integration. The signal at line 104b resets flip-flop 102 so that it returns to a quiescent condition ready to receive a subsequent trigger pulse at terminal 100 indicating that an update of the memory banks is completed.

Also seen in FIG. 4 is an azimuth memory 146 which is, in this embodiment, a counter capable of counting up to 255 and then reversing and counting down to 0 by the following means. When azimuth memory 146 reaches the 0 count terminal 146a is energized to thus set flip-flop 148 to qualify gate 142. The output of gate 142 (PRF) causes the counter to count up. When the counter reaches the 255 count terminal 146b is energized to thus reset flip-flop 148, thus qualifying gate 144 and closing gate 142. The output from gate 144 (PRF) causes azimuth memory 146 to count down. It can thus be seen that the azimuth memory continuously counts up and then counts down. The counts to be accumulated by the azimuth memory are supplied at terminal 44 at which terminal a pulse is applied each time the radar transmitter transmits. The count contained in azimuth memory 146 is fed to a digital-to-analog converter 150, the output of which is used to position the radar antenna. In the embodiment shown, it is assumed that the radar azimuth sweep covers 120° which is divided by azimuth memory 146 into 256 parts or 0.47° per part.

The signal PRF/2 which it will be remembered is a square wave, is impressed at terminal 75 from where it is communicated to the inhibit terminal of gate 139. The subsequent PRF signal at terminal 44 thus opens gate 139 so that the instantaneous count contained in azimuth memory 106 is entered into azimuth locater 133. The most significant bit from azimuth memory 146 is not applied to the azimuth locater 133. The specific use of the most significant bit will be shown later. Azimuth locater 133 is a counter having a capability of counting down from a count of 64 which is the number of words storage capacity in one-half of each portion of the main memory. When the azimuth locater reaches the 0 count a signal is generated at terminal 133a which is used to trigger flip-flop 135. It will be noted that flip-flop 135 is originally in the reset condition by reason of a previous pulse at terminal 88.

Azimuth locater 133 receives clock pulses from gate 132 when that gate is qualified. The gate is qualified by a signal on line 130a from flip-flop 130 after the lower excursion of signal PRF/2 appears on terminal 75, from a source to be shown, and a subsequent pulse is applied at terminal 44. With gate 132 thus qualified, the clock pulses at terminal 88 can move therethrough to count down azimuth locater 133 to 0 at which time the output at terminal 133a is generated as previously discussed. With flip-flop 135 now in the set state gate 112 becomes qualified and permits the signal $f_0$ at terminal 74 to pass therethrough onto line 112a. As previously mentioned the signal on line 112a permits integrator 125 to perform the decoder portion of its operation. In other words, the clock pulses on line 112a cause the results of the integration to appear at terminals 126 and 127.

Note also that during the time the $f_0$ clock pulses are on line 112a, the set output signal for flip-flop 135 causes gates 138 and 140 to be qualified. Accordingly, if the most significant bit of azimuth memory 146 is a logical 1 a logical 1 will appear at terminal 153. On the other hand, if the most significant bit of azimuth memory 146 is a logical 0 a logical 1 will appear on terminal 152.

Since gate 112 is opened by the signal on line 133a from azimuth locater 133, and this signal is generated in response to a pulse at terminal 88 from the $f_0/w$ signal, and thereafter gate 112 is closed when flip-flop 135 is reset by the next pulse at terminal 88, it can be seen that gate 112 remains open during the time interval between two consecutive pulses at terminal 88, which is, of course, the time required for exactly 128 pulses at $f_0$ to pass through gate 112.

Figure 9:
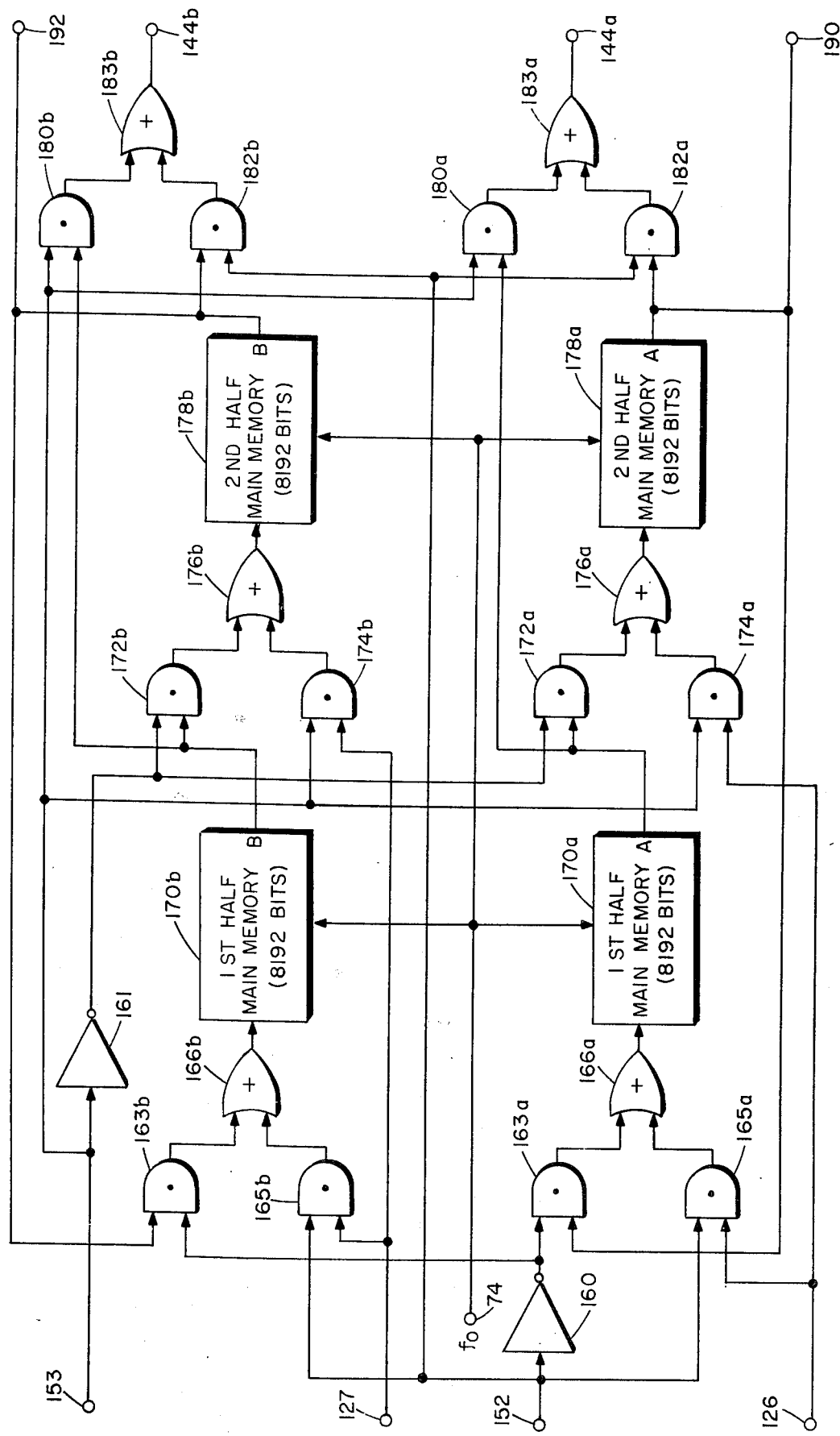
FIG. 9 is a block diagram which illustrates the main memory and associated gates of the invention.

Refer now to FIG. 9 which shows a block diagram of the main memory. The main memory is comprised of an A memory which includes a first half 170a and a second half 178a and a B memory comprised of a first half 170b and the second half 178b. The A and B memories are generally identical to one another. The elements of the A memory have a suffix a with their identifying number and the elements of the B memory have the suffix b with their identifying number. Each memory section, either section A or section B, has a capacity of storing 128 words, where a word is comprised of 128 bits as previously described. The main memory is comprised of circulating shift registers which being dynamic requires continuous clocking to maintain the data therein. These clocks are applied at the $f_0$ frequency from terminal 74 to each circulating shift register of the memory. The main advantages of this type of memory for this application is that by providing a scan reference and a line reference for the CRT displays, to be described, no need for addressing exists. The data is fed simultaneously from both sections A and B of the main memory to the display through an output buffer, also to be described, with no control required other than the line and scan resets.

A double or two port entry system is required in each portion of the memory because of the update requirements, hence, each section of the main memory, sections A and B, is split into two halves as shown, the first half and the second half. Since the sections of the memory are identical to one another and they operate simultaneously and in parallel with each other only main memory section A will be described. It should be understood that main memory portion B operates in the same manner and simultaneously. Gates 163a, 165a and 166a provide access to first half 170a and gates 172a, 174a and 176a provide access to the second half 178a. In this embodiment approximately 20 milliseconds are required to shift all the bits through the memory while the update must be accomplished in 10 milliseconds. The means by which information is transferred into the memory from terminals 126 and 127 in addition to means for accomplishing the double entry update will now be described.

Note that when terminal 152 is energized, indicating that the most significant bit of the azimuth memory 146 of FIG. 4 is a logical 0, gate 165a is qualified while gate 163b is closed due to the action of inverting amplifier 160. In addition, AND gate 182a is qualified. Normally, the binary information circulating through the main memory issues from the second half 178a at terminal 190 for portion A and at terminal 192 for B, and then through the normally qualified gate 163a and OR gate 166a into the first half 170a. However, with gate 163a closed, the information issuing from the main memory second half 178a cannot recirculate back into the memory and the data at terminal 126 will take its place by entering the memory through now qualified gate 165a and OR gate 166a. The data to be displaced, that is, the data issuing from second half 178a, passes to the now qualified gate 182a and OR gate 183a to terminal 144a, where it is applied to the decoder of FIG. 6. In like manner the information issuing from main memory section B and which is to be displaced by new data appears at terminal 144b which is also seen at FIG. 6. If terminal 153 is energized, gates 174a and 180a will be qualified whereas gate 172a will be closed due to the action of inverting amplifier 161. Thus, the data issuing from the first half 170a will be extinguished while new data at terminal 126 will enter the second half 178a through gates 174a and 176a. At the same time the displaced data will pass through gates 180a and 183a to terminal 114a for use by the decoder of FIG. 6. Of course, with respect to main memory section B displaced data for the first half 170b appears at terminal 144b. Note that the information stored in the main memory is circulating at the $f_0$ rate due to the clock pulses at terminal 74. This is the same rate of course with which the data is received at terminals 126 and 127.

The above described updating of the main memory will occur only when flip-flop 135 of FIG. 4 is in the SET state, during which time it will be remembered exactly 128 clock pulses at frequency $f_0$ are applied to the integrator to clock the information through the decoder and onto terminals 126 and 127. During this time that flip-flop 135 is in the SET state, gates 138 and 140 of FIG. 4 are qualified so that a logical 1 appears at one of the terminals 152 or 153 and a logical 0 appears at the other terminal. When flip-flop 135 is in the RESET state both gates 138 and 140 are closed and logical 0's appear at both terminals 152 and 153. When this occurs gates 163a, 163b, 172a and 172b are open while the other AND gates of FIG. 9 are closed so that the information stored in the main memory is recirculated therein.

Figure 10:
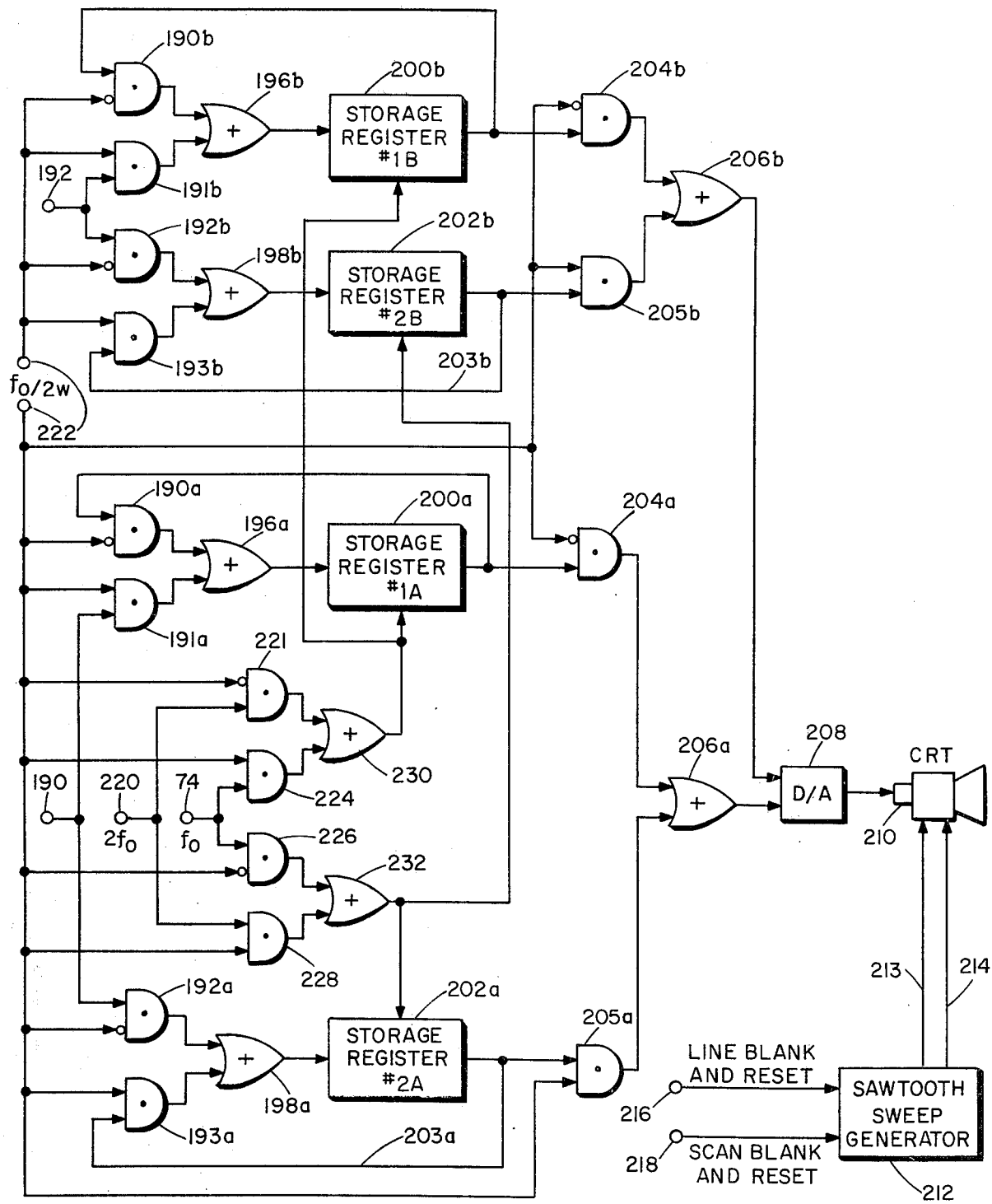
FIG. 10 is a block diagram which illustrates the output section of the invention.

An output buffer connected between the main memory and the indicating device, in this embodiment a cathode ray tube, is seen in FIG. 10, reference to which should now be made. In this figure, the output buffer is comprised of two identical sections, an A section and a B section. As before, those elements in the A section have the suffix $a$ after their numeral and those elements in the B section have the suffix $b$ after their numeral. The operation of both sections is identical and synchronous with one another. Therefore, only the operation of the A section will be described, it being understood that the operation of the B section is identical thereto. The A section is comprised of two storage registers, 200a and 202a, each of which is capable of storing one binary word, that is, they each individually have the capacity of storing 128 bits. It is the function of this section to alternately store in one storage register a word from the main memory at the rate $f_0$ while simultaneously reading out the word previously stored in the other storage register to the cathode ray tube at a higher rate, suitably twice as fast. In other words, each word is readout twice to the cathode ray tube. In effect, the output buffer allows the entire contents of the main memory to be readout at double speed to the cathode ray tube. The output from section A of the main memory appeaars at terminal 190, while the output from section B of the main memory appears at terminal 192, these terminals also being seen in FIG. 9. Terminal 190 communicates with AND gates 191a and 192a. There is impressed on terminal 222 a square wave having a pulse repetition frequency at half the frequency of the square wave on terminal 88 seen earlier. That is, the signal at terminal 222 has a pulse repetition frequency equal to $f_0/2w$. The signal at terminal 222 is used to qualify gates 191a, 193a, 224 and 288 and is used to inhibit gates 190a, 192a, 221 and 226. The gates 221, 224, 226, 228, 230 and 232 are used to provide the correct clocking pulses to the various storage registers. To accomplish this, the clocking pulses $f_0$ at terminal 74 are applied to gates 224 and 226 while clocking pulses at twice the $f_0$ rate at terminal 220 are applied to gates 221 and 228. It should be obvious that the signal at terminal 222 is high during alternate groups of 128 pulses of the clock signal $f_0$. Thus, with the signal at terminal 222 high, gate 191a is opened while gates 190a and 204a are closed. Thus, the data issuing from the main memory at terminal 190 enters through gate 191a and 196a into the storage register 200a. At the same time gate 224 is open while gate 221 is closed, so that the frequency signal $f_0$ from terminal 74 moves through gate 224 and 230 to strobe the storage register 200a. Of course, the $f_0$ signal is also applied simultaneously to storage register 200b. Also, at the same time, gate 192a is inhibited while gates 193a and 205a are open. Thus, the information in the storage register 202a is circulated via line 203a and gates 193a and 198a. At the same time, the data from storage register 202a moves through gates 205a and 206a to a digital-to-analog converter 208. Simultaneously, the data at register 202b is passed through gates 205b and 206b to the D/A converter 208. The binary bits arriving simultaneously at converter 208 are analyzed and a resultant analog signal having four possible levels is generated and applied to the cathode ray tube 210. In essence, the converter 208 generates any one of four possible levels in response to each pair of binary bits which is simultaneously applied thereto from gates 206a and 206b. The design of a D/A converter suitable for use in this invention is well known to those skilled in the art and need not be described here. During the time the storage registers 202a and 202b are supplying their data to convertor 208, gate 226 is inhibited and gate 228 is opened so that the signal from the terminal 220 moves therethrough and through gate 232 to clock these storage registers. Thus, as earlier explained, the word previously stored in the storage registers is read twice into the cathode ray tube 210 in the same time that a single word is entered from terminals 190 and 192 into the storage registers 200a and 200b, respectively. When the signal at terminal 222 goes low, the operation of the various storage registers alternates. That is, the information in storage registers 200 a and 200b in response to the clocking pulses $2f_0$ now recirculates and additionally is readout to the cathode ray tube through converter 208 while the data in storage registers 202a and 202b is replaced by new data from the main memory.

A sawtooth sweep generator 212 supplies two sawtooth sweeps to cathode ray tube 210. The first via line 212 is applied to the cathode ray tube range sweep and the second via line 214 is applied to the cathode ray tube azimuth sweep. A train of pulses, from a source to be described, and having a repetition frequency of $2f_0/w$, that is, at the rate words are read from the output buffer into the cathode ray tube, and synchronized therewith, are applied at terminal 216 and are used to blank the range sweep return of the cathode ray tube and to reset the sweep generator of range sweep signal. The second train of pulses also from a source to be described and having a repetition frequency of $f/_R$, that is, at the rate the information in the main memory is completely circulated therethrough, and consequently into the cathode ray tube, is applied at terminal 218. This second train of pulses is used to blank the azimuth sweep return of the cathode ray tube and also to reset the azimuth sweep generator azimuth sweep signal.

Figure 11:
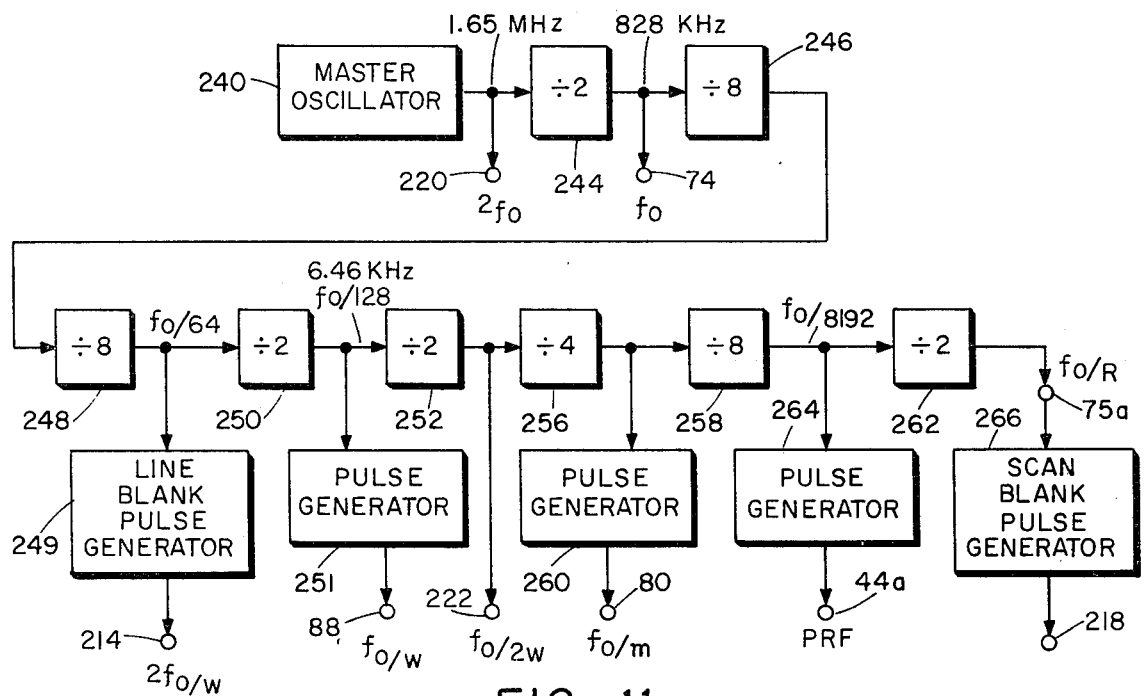
FIG. 11 is a block diagram which illustrates the control signal generating means of the invention.

Refer now to FIG. 11 which shows means by which the various frequency signals mentioned above are generated. A single master oscillator 240 is provided which generates a basic frequency of 1.65 MHz for the system described in this embodiment. This frequency has been designated as the $2f_0$ frequency and appears at terminal 220. It will be remembered that this frequency is used by the output buffer of FIG. 10 to write stored digital data at twice the normal information rate onto the cathode ray tube. This frequency is divided by a divide-by-two divider 244 to 828 KHz which is available as the $f_0$ signal at terminal 74. This is the normal bit rate of the system and is used by the main memory and memory banks and for access into and out of these units. The $f_0$ signal is divided by 64 by the two divide-by-eight dividers 246 and 248. A pulse generator 249 is triggered by the resultant signal once every sixty-four cycles of the $f_0$ signal. The pulse generator output pulse appears at terminal 216 and is used in FIG. 10 to blank and reset the range line sweep output of sawtooth sweep generator 212. The divide-by-sixty-four function is required since binary words are being written from the output buffer into the cathode ray tube at twice the normal system data rate.

The frequency signal is further divided by a divide-by-two divider 250 to produce a frequency signal at 6.46 KHz which is $f_0/128$. This signal triggers pulse generator 251 to generate at terminal 88 a train of pulses having a pulse repetition rate of $f_0/w$ where w is the number of bits in a binary word of the system of this embodiment.

The frequency signal is further divided by divide-by-two divider 252 to generate at terminal 222 a frequency signal at half the previous frequency, that is, a signal at $f_0/2w$. This signal is used in FIG. 10 as previously described, to alternately permit the output buffer to store therein a word from the main memory and to simultaneously supply a previously stored word to the cathode ray tube.

The frequency signal is further divided down by a divide-by-four divider 256, the output of the divider being used to trigger pulse generator 260. The resultant train of pulses is generated at terminal 80. These pulses have a pulse repetition frequency of $f_0/m$ where m is the number of bits either in memory bank 56 or 66 of FIG. 3. Hence, a pulse appears at terminal 80 each time the data in the memory banks has completely circulated therein.

The frequency signal is again divided down by a divide-by-eight divider 258 to generate a signal at $f_0/8192$. This signal triggers pulse generator 264 to generate a train of pulses at terminal 44a. This train of pulses has previously been designated PRF and is used in the coherent form of the invention as previously described and also to trigger the transmitter of an associated radar. In the coherent form of the invention terminal 44a coincides with terminal 44 previously seen. In the non-coherent form of the invention pulse generator 264 and terminal 44a are not needed.

The frequency signal is again divided in half by divide-by-two counter 262 to generate at terminal 75a a signal designated $f_0/R$ where R is the number of bits storage of each portion of the main memory. In the coherent form of the invention terminal 75a coincides with terminal 75 previously seen. This signal is also used to trigger the pulse generator 266, the output of which appears at terminal 218 and is used by the sawtooth sweep generator 212 of FIG. 10 to blank and reset the cathode ray tube azimuth sweep. It should be obvious that a pulse appears at terminal 218 each time the information stored in the main memory is completely circulated therethrough.

It will be noted that in the coherent form of the invention all the signals are coherent. However, in certain applications it might be desired that the pulse repetition frequency of the radar not be coherent with the other signals used for controlling the operation of the indicator. In this case the pulse generator 264 would not be required and the PRF signal at terminal 44 will be suitably derived from the radar transmitter itself in the manner well known to those skilled in the art. Specifically, one skilled in the art should be able to obtain a train of pulses in which the pulses occur simultaneously with the transmissions from a radar transmitter.

Figure 12:
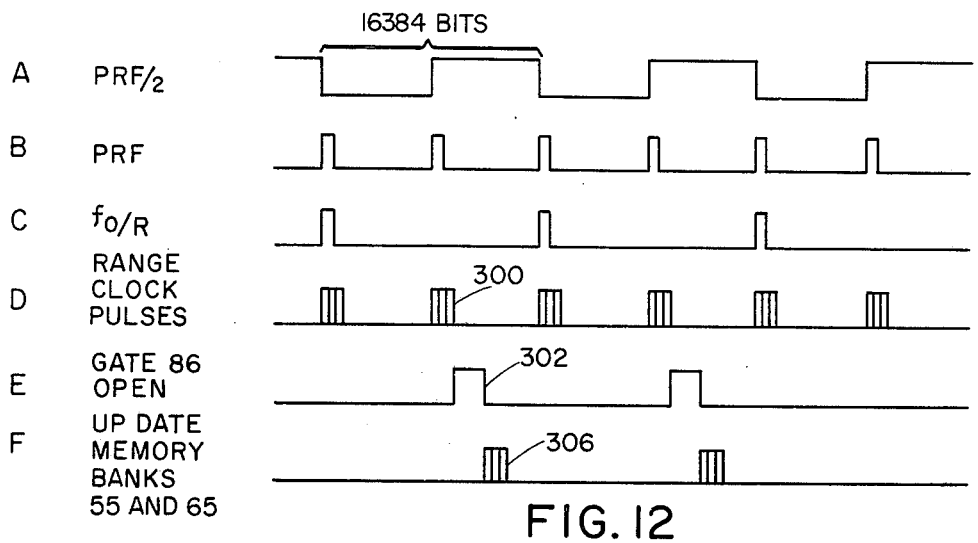
FIGS. 12, 13 and 14 are timing diagrams which are helpful in explaining the operation of the invention.

FIG. 12 shows various timing diagrams which are useful in explaining the sequencing of operations in this embodiment of the invention, and reference should now be made to this figure together with the other figures as required. On line A there is seen the square wave PRF/2. In the coherent form of the invention the PRF/2 square wave is the $f_0/R$ square wave. This signal appears at terminal 75 and one period of the signal in the coherent form of the invention contains 16,384 cycles of the $f_0$ signal. In other words, since the main memory is clocked by the $f_0$ signal and hence has an informational rate equal to $f_0$, 16,384 bits pass through each position of the main memory during one cycle of the signal shown on line A.

Line B shows the PRF signals at terminal 44 and which occur at each transition of the signal shown on line A. It will be remembered that the PRF signals are synchronized with the radar transmissions and are used in FIG. 3 to reset the video counter so that a word of data may be entered into each input buffer. At line D of FIG. 12 there is seen the range clock pulses which it will be remembered with respect to FIG. 3 are used for entering the digitized video into the input buffers. It will be remembered that the rate at which the range clock pulses are generated is determined by the desired range of the radar. In the embodiment described where a binary word contained 128 bits it will be remembered that for a 200 mile range a bit rate of 53 KHz is required. Of course, each bundle of range clock pulses shown, for example, bundle 300, contains 128 range clock pulses.

Line F of FIG. 12 shows the clock pulses which are used to enter the information from the input buffers into the memory banks. It will be remembered that these clock pulses occur at the $f_0$ rate and that 256 of these pulses are required to enter the two words from the input buffer into the memory bank. Thus, each pulse bundle, for example, bundle 306 contains 256 pulses at the $f_0$ rate. Each group of these pulses occurs after alternate groups of pulses shown on line D and require considerably less time for each group of pulses than the time between consecutive bundles at line D.

Line E of FIG. 12 shows the time during which gate 86 of FIG. 3 is open, that is, the time within which clock pulses are applied to the down counter 82 of FIG. 3. It should now be clear that down counter 82 maintains the information circulating in the memory banks in synchronism with the information entering therein from the input buffers. It should also be clear that the information contained in the address counter 83 of FIG. 3 is entered into the down counter 82 immediately after the completion of each alternate group of range clock pulses, for example, pulses 300 and that when the down counter is counted to 0 as at transition time 302 of line E, the contents of the input buffers are entered into the memory banks.

Line C shows the train of pulses at the repetition frequency $f_0/R$ which are generated by pulse generator 266 of FIG. 11 and which are used to blank and reset the azimuth sweep of the cathode ray tube as previously described with respect to FIG. 10.

Figure 13:
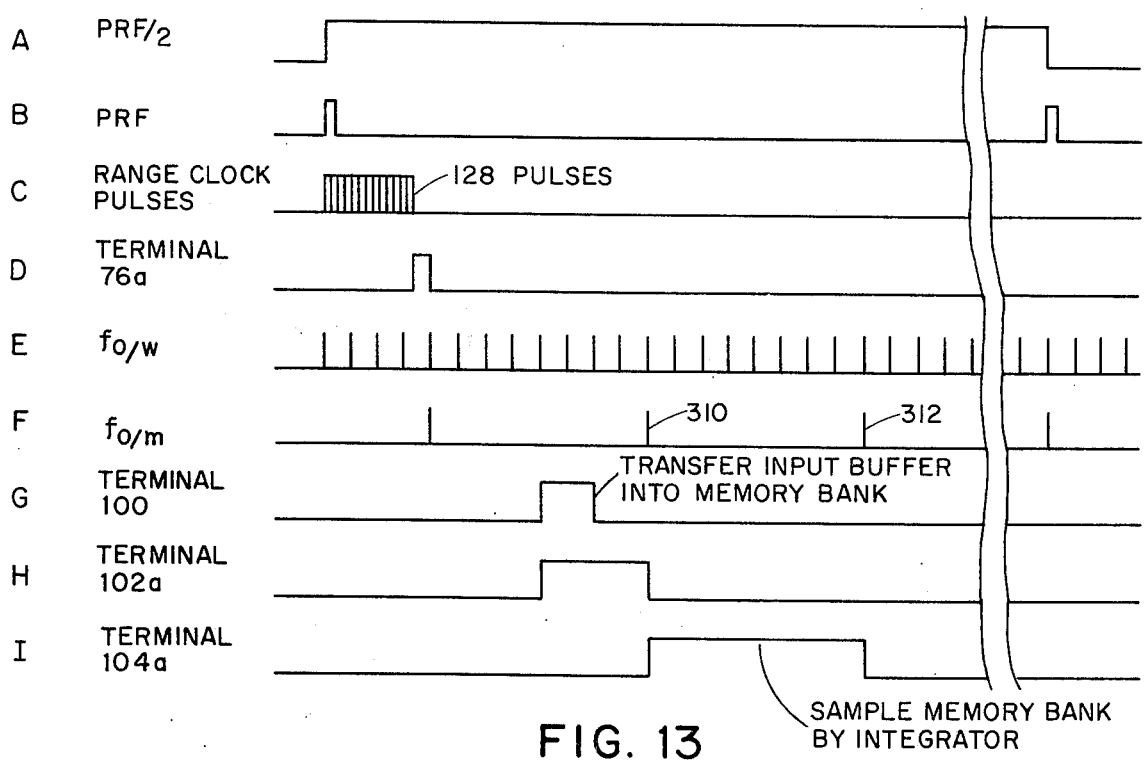

FIG. 13 shows various of the timing diagrams of FIG. 12 greatly enlarged and reference should now be made to this figure together with FIGS. 3 and 4. At lines A, B and C of FIG. 13 are seen respectively the PRF/2 signal, PRF signal, and the range clock pulses. At line D the output from flip-flop 76 which appears at terminal 76a is seen. At line E are seen the $f_0/w$ signals which are generated at terminal 88 of FIG. 11. It will be remembered that these signals occur once every 128 cycles of frequency $f_0$. At line F are seen the $f_0/m$ signals which are generated at terminal 80. These pulses are generated once for every eight of the pulses in the signal at line E. Since there are 128 bits in a word and the capacity of each memory bank is eight words, the pulses at line E are synchronized with the end of a word at the rate $f_0$, while the pulses at line F are synchronized with bits circulating in the memory banks at the rate $f_0$. More particularly, a pulse as shown at line F is generated each time the information stored in either memory bank has been completely circulated therethrough. Returning to FIGS. 3 and 13, the signal at terminal 76a qualifies gate 78 which is opened by a subsequent signal at terminal 80 ($F_0/m$). The opening of this gate resets flip-flop 76, thus extinguishing the signal at terminal 76a and simultaneously enters the instantaneous contents of the address counter 83 into the down counter 82. For the purposes of this explanation, it is assumed that the number 4 is entered into the down counter. The down counter now accumulates pulses from terminal 88, that is the pulses at frequency $f_0/w$ as seen on line E of FIG. 13. After four of these pulses the down counter reaches 0 and its resultant output signal triggers flip-flop 90 to generate an output at terminal 100 as seen at line G. During this time that terminal 100 is energized gates 48 and 58 are opened to permit the input buffers to empty into the memory banks. Terminal 100 remains energized for two subsequent pulses from the signal shown at line E. At the same time terminal 100 is energized it can be seen in FIG. 4 that flip-flop 102 is triggered so as to energize terminal 102a as also seen at line H. Since terminal 102a is connected to the set terminal of flip-flop 104 and the toggle terminal of this latter flip-flop is connected to terminal 80, that is, the terminal upon which the $f_0/m$ signal of line F is connected, a subsequent pulse of the signal shown on line F, for example, pulse 310, triggers flip-flop 104 into the set state so that a relatively high signal is generated at line 104a, to thus qualify AND gate 110 permitting the $f_o$ pulses on terminal 74 to pass therethrough to strobe integrator 125. The next pulse of the signal shown on line F, for example, pulse 312 extinguishes the signal on line 104a. This is exactly the time required for the entire contents of the memory banks to be sampled by the integrator. It can thus be seen that at alternate transmissions of the radar transmitter two words are added into the memory bank, each word being the result of a transmission, and in addition the eight words contained in the memory bank are sampled by the integrator and that the various operations are synchronized with one another.

It should be obvious that if address counter 83 contains fewer or more counts than the postulated 4 counts, the signal at line G of FIG. 13 would move bodily either to the left or right, respectively, while the signal shown at line I would remain constant and the leading edge of the signal at line H would move to coincide with the leading edge of the signal at line G, and its trailing edge will remain the same.

Figure 14:
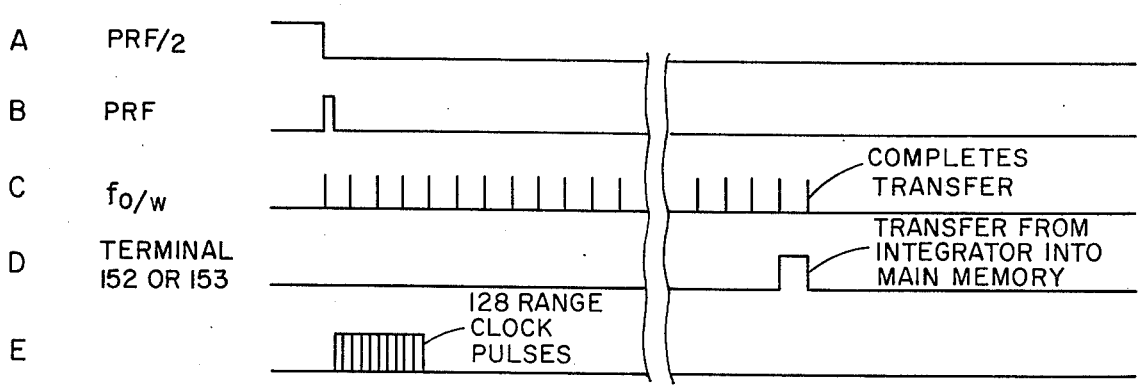

FIG. 14 is a timing diagram which is useful in explaining how the contents of the integrator are entered into the main memory and reference should now be made to that figure together with FIGS. 4 and 9. At line A of FIG. 14 there is seen the PRF/2 signal while at line B is seen the PRF signal and at line C is seen the $f_0/w$ signal. With the PRF/2 signal in the down state a PRF signal triggers flip-flop 130 to qualify gate 132 and additionally energizes the set terminal of flip-flop 135. At the same time the PRF signal acting through gate 139 and gate 134 samples the contents of azimuth memory 146 into the azimuth locator 133. Thus, a number related to the location of the radar antenna is now entered into the azimuth locater 133. In addition, the information now stored in the integrator storage registers 125b is the information received from the antenna while generally at that azimuth position. It will be remembered that integration is performed on eight words from each memory bank and the input into the main memory is the result of this integration. It is desirable that the input into the main memory be the result of integration of words resulting from transmissions on both sides of the azimuth corresponding to the number in the azimuth memory. This can be accomplished by having the antenna lead the azimuth memory. The azimuth locater is clocked down by the $f_0/w$ signal shown at line C. When the azimuth locater reaches 0 either terminal 152 or 153 is energized depending upon the instantaneous state of the most significant bit of the azimuth memory 146. As previously described, with either terminal 152 or 153 energized, the contents of the integrator are transferred into the main memory portions A and B. Thus, reviewing the operation of the indicator with respect to FIGS. 13 and 14, it should now be understood that during the first half cycle of the PRF/2 signal the contents of the input buffers are transferred into the memory banks and in addition the memory banks are sampled by the integrator, while during the second half cycle of the PRF/2 signal the contents of the integrator are transferred into the main memory. Each of these operations is synchronized with one another as explained with respect to FIG. 11 so that there is contained in the main memory complete information as to the total radar scan and in ordered sequence. This information is now retrieved and displayed on a cathode ray tube through the output buffers and D/A converter as has previously been adequately described.

Figure 15:
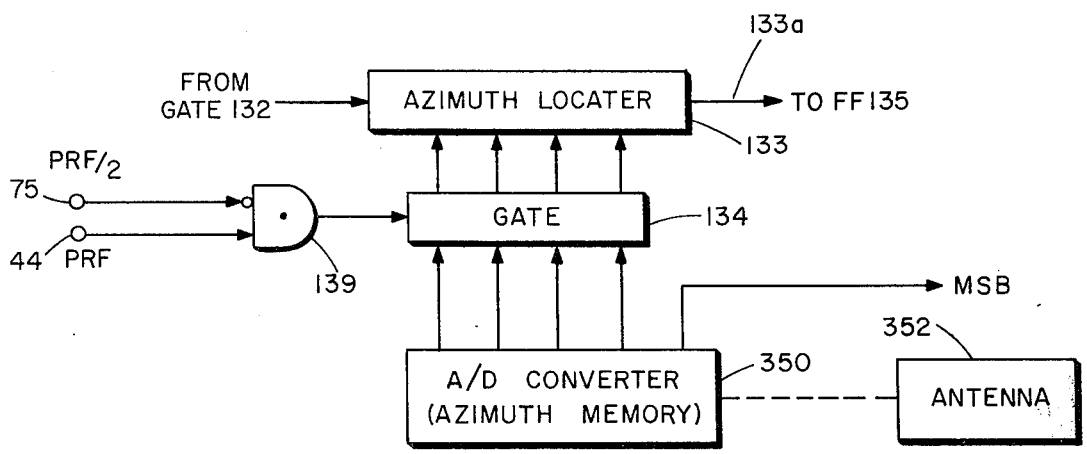
FIG. 15 is a block diagram which illustrates in part the non-coherent form of the invention.

In the above description the radar antenna is driven by the control logic of the display system. A simple modification of the invention allows the antenna to operate independently. This modification involves the elimination of certain elements seen in FIG. 4, reference to which figure should again be made. For this modification, the azimuth memory 146, antenna sweep control 148, D/A converter 150 and gates 142 and 144 are eliminated. FIG. 15 shows the element to be substituted for those eliminated from FIG. 4. Reference should now also be made to FIG. 15. In this latter figure the azimuth locater 133, gate 134 and gate 139 of FIG. 4 are again seen. An A/D converter is inserted in place of the elements eliminated from FIG. 4. This A/D converter is ganged to the radar antenna, for example antenna 352, and generates a binary output number which indicates the azimuth position of the antenna similar to the binary number generated by the azimuth memory 146 of FIG. 4. In essence, A/D converter 350 is an azimuth memory in that it generates a number indicative of antenna position.

Figure 16:
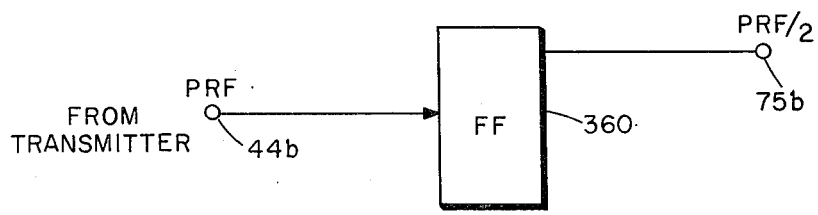
FIG. 16 is a block diagram which illustrates a means for dividing the PRF signal to produce the PRF/2 signal suitable for use in the non-coherent form of the invention.

It is sometimes advantageous to obtain the PRF signal from the radar transmitter rather than controlling the radar transmitter from the master oscillator of FIG. 11. The form of the invention wherein the PRF signal is obtained from the radar transmitter has been termed herein the non-coherent form of the invention. It will be remembered that in the non-coherent form of the invention the pulse generator 264 of FIG. 11 is not required and can thus be omitted. In addition, the signal at terminal 75a of FIG. 11 is not used. Rather, referring to FIG. 16, a flip-flop can be used, such as flip-flop 360. The flip-flop toggle terminal is connected to a terminal 44b upon which the PRF pulses from the radar transmitter are suitably applied. The PRF/2 square wave signal is thus generated at terminal 75b. In the non-coherent form of the invention terminal 44b coincides with terminal 44 and terminal 75b coincides with terminal 75, both of which terminals have been earlier described. With respect to FIG. 13, the signals on lines E to I will most likely shift slightly with respect to the signals on lines A to D. With respect to FIG. 14 the signals on line C will shift slightly with respect to the other signals. In any event, the shifting will be such that the various updating and data transfers will occur within a proper portion of the PRF/2 square wave to provide synchronization of the display system as a whole.

Figure 18:
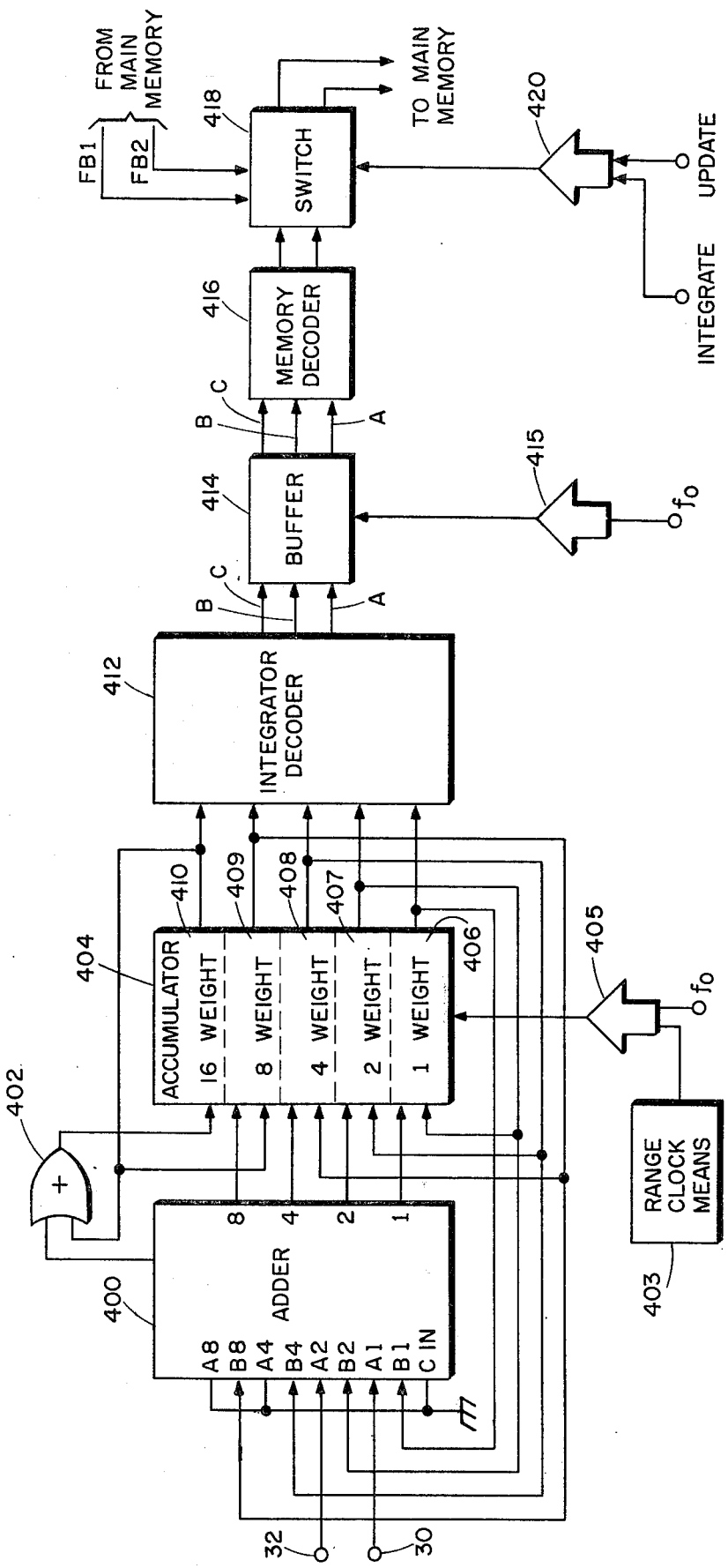
FIG. 18 is a block diagram which illustrates in part a further embodiment of the invention.

Another form of the invention is illustrated in part by FIG. 18, reference to which figure should now be made. In this figure a buffer means includes an integrator which precedes the actual buffer. Specifically, the digitized radar return at terminals 30 and 32 is impressed directly on the $A_1$ and $A_2$ input terminals of adder 400, which can be essentially identical to adder 125a previously described. An accumulator 404 is comprised of the five shift registers 406, 407, 408, 409 and 410, each of which has a capacity to store a number of bits equal to the number of bits in a word, in this case 128 bits. This accumulator is preferably identical to the accumulator 125b previously described with the input and output connections being also identical except for the fact that the output terminals of shift registers 407, 408, 409 and 410 are additionally connectable to the input terminals of shift registers 406, 407, 408 and 409, respectively. It can also be seen that the input and output connections of adder 400 are essentially identical to those connections of adder 125a with the exception that the carry out is applied to shift register 410 through OR gate 402 together with the output terminal of the same shift register. Also as before the shift registers, 406 to 410, have weights respectively of 1, 2, 4, 8 and 16. In addition, this form of the invention includes an integrator decoder 412, a buffer 414, a memory decoder 416 and a switch 418. The function of these latter elements will be described below. The gate means 405 applies either range clock pulses, previously referred to as $f_c/n$ pulses, from a range clock means 403 or $f_o$ clock pulses to the shift registers of accumulator 404 to shift data into and out of the accumulator as will be described. In addition, the gate means 415 applies $f_o$ pulses to buffer 414 at the proper times to be described to shift information into and out of that buffer. It will be particularly noted with respect to FIG. 18 that no memory banks similar to banks 56 and 66 of FIG. 3 are used nor required, the accumulator performing the function of storing a plurality of range words as will also be described now.

Figures 19, 20, 21:
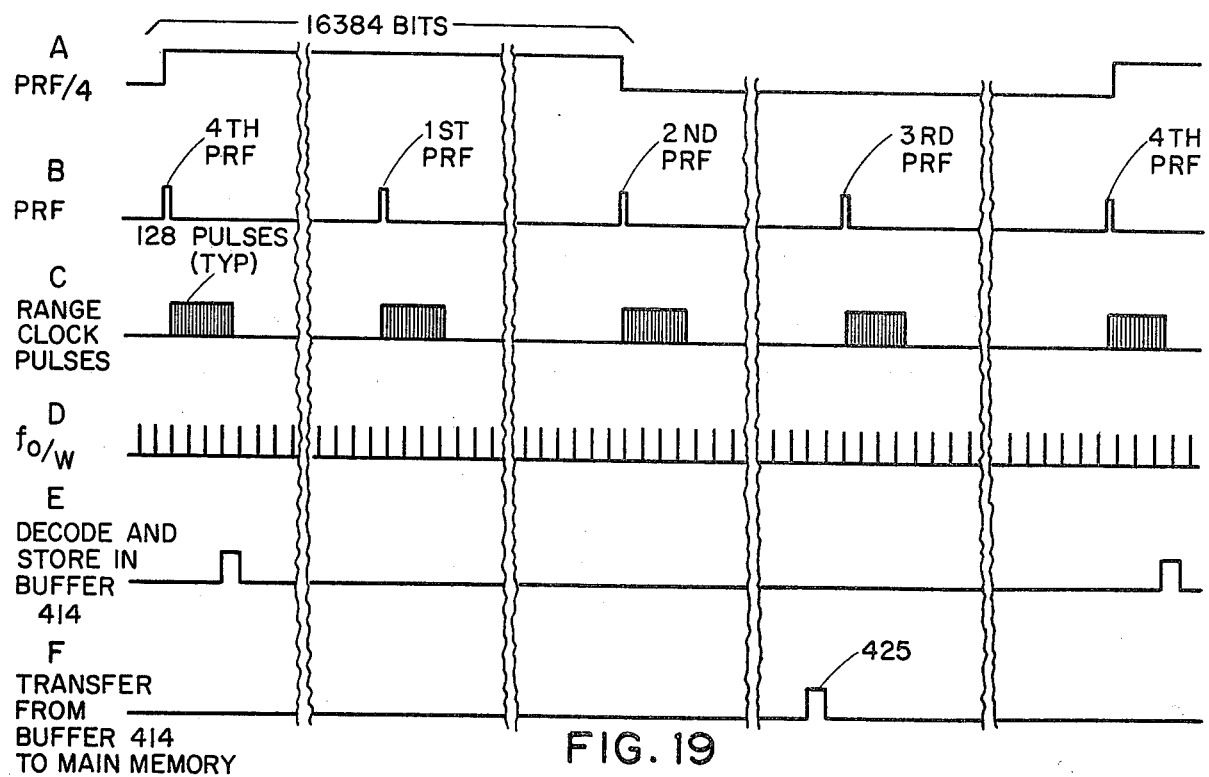
FIG. 19 comprises timing diagrams which assist in explaining the operation of the embodiment of FIG. 18.
FIGS. 20 and 21 show the truth table and logic equation respectively which define the operation of the embodiment of FIG. 18.

The operation of the embodiment shown in FIG. 18 can best be described with respect to the timing diagrams of FIG. 19, reference to which should now also be made. At line A of FIG. 19 is seen a square wave signal PRF/4, which is somewhat similar to the PRF/2 signal previously described with respect to the earlier embodiment of the invention; however, in this case 4 PRF pulses are generated during one period of the signal shown at line A. It should also be noted that the pulse repetition frequency of the PRF/4 signal is such that 16,384 of the $f_o$ pulses occur during one half period of the PRF/4 signal. This contrasts from the condition in the earlier described embodiment wherein 16,384 $f_o$ pulses occured in one complete period of PRF/2 signal. It is assumed that in this latter embodiment like the former embodiment the main memory includes storage capacity for 16,384 bits, that being 128 words of 128 bits each. It can thus be seen that the memorized data circulate completely through the main memory once during each half period of the PRF/4 signal. As in the previous embodiment, the range clock means 403 includes a source of clock pulses having a variable pulse repetition frequency, selectable in accordance with desired range, and additional means for applying exactly 128 range clock pulses through gate 405 to the shift registers of accumulator 404 subsequent to a PRF signal, that is, after the radar associated with this display has made a transmission, and during the time that a radar return from that transmission is expected.

For discussion purposes, assume that each bit of the five accumulator shift registers is at logic level 0 and the first PRF of an integration period is generated. The resulting digitized radar return now appears at terminals 30 and 32 as previously described with respect to the earlier embodiment. Simultaneously 128 range clock pulses having a pulse repetition frequency selected in accordance with the desired range, is applied from range clock means through gate means 405 to accumulator 404. In response to the range clock pulses data is clocked out of each accumulator shift register on a bit-by-bit basis and at the range clock pulse repetition frequency, then fed to the adder; i.e., weight 1 data contained in shift register 406 is clocked out and applied to the B1 input of adder 400; weight 2 data contained in shift register 407 is clocked out and applied to the B2 input of adder 400; weight 4 data contained in shift register 408 is clocked out and applied to the B3 input of adder 400; while weight 8 data contained in shift register 409 is clocked out and applied to the B4 input of adder 400. At the same time, the receiver intercepts the radar return from the generated PRF, processes this information and applies the data at the rate of the radar return to terminals 30 and 32. As previously described, the video data that is supplied from the receiver is digitized and in the form of a two bit binary weighted number. Thus, simultaneously with the circulation of information from accumulator 404 to adder 400 the digitized radar return appears at terminals 30 and 32 and is added thereto. The resulting sum during each range clock pulse is fed to the accumulator 404. Since the data contained in each accumulator shift register was assumed to be zero when the first PRF occurred, a binary weight of zero was added to the new data as it appeared at terminals 30 and 32 of the adder. At the end of the 128th range clock pulse, bit 1 of each of the five accumulator 128 bit shift registers depict a 5 bit binary number representing the sum of the data inputs at terminals 30 and 32 during the first range clock pulse; bit 2 of the five accumulator 128 bit shift registers depict a 5 bit binary number representing the sum of the data at terminals 30 and 32 during the second range clock pulse, etc.

When the second PRF is generated, causing the second digitized radar return to be impressed at terminals 30 and 32, the second set of 128 range clock pulses is applied from range clock means 403 through gate means 405 to the shift registers of accumulator 404. Thus, the binary sum previously contained in the accumulator for the first interrogation (PRF) is returned to the adder where it is added to the data at terminals 30 and 32 received from the radar return resulting from the second PRF. At the end of the 128th range clock pulse subsequent to the second RPF, bit one of each of the five 128 bit shift registers would depict a five bit binary number which represents the sum of the data at terminals 30 and 32 received during the first range clock pulse of the second radar return and the binary sum previously contained in the accumulator corresponding to the first range clock pulse subsequent to the first PRF, etc. This sequence repeats for four PRF's, the range clock means including further means for counting the end of each bundle of 128 range clock pulses and for generating a signal when four such counts are made. In FIG. 19 it will be noted that at line B the PRF signals are labeled first, second, third and fourth PRF, respectively, this implying continuous cycles of four PRFs, with line C showing the bundles of range clock pulses occurring subsequent to each PRF during the time that a radar return is expected. Line D shows the $f_o/w$ signal. As in the earlier embodiment an $f_o/w$ signal is generated for each 128 of the $f_o$ pulses.

It should be noted at this time that when the range clock pulses are applied to the shift registers of accumulator 404 the recirculation of data from the outputs of shift registers 407, 408, 409 and 410 respectively to the inputs of shift registers 406, 407, 408 and 409 is blocked, the accumulator including gates for this purpose which respond to the range clock pulses to so block recirculation.

As seen at FIG. 19, line E, the information in the accumulator is decoded and stored in buffer 414 through integrator decoder 412 during the $f_o/w$ period immediately following the end of the 128 range clock pulses after the four PRF. This is accomplished as follows.

At the proper time, that is the $f_o/w$ pulse following the end of the range clock pulses after the fourth PRF, gate means 405 and 415 are qualified to permit the $f_o$ pulses to pass therethrough and onto the shift registers of accumulator 404 and into buffer 414. In this embodiment buffer 414 is comprised of three shift registers each having the capacity to store 128 bits. In addition, the $f_o$ pulses passing through gate means 405 qualify gates which are part of accumulator 404 to permit recirculation of data therein, that is, circulation from the output terminals of shift registers 407 to 410, respectively, to the input terminals of shift registers 406 to 409 and from the output of shift register 410 through OR gate 402 to the input of shift register 410. During this time, of course, there is no input data at terminals 30 and 32 of adder 400 and there is thus no input to the accumulator from the adder. This recirculation of data in accumulator 404 in essence divides the data therein by two so that after the recirculation period accumulator 404 contains data of one half weight of what was contained therein previously.

Simultaneously with this recirculation of data in the accumulator, data passes through the integrator decoder 412 where it is decoded for eventual storage in buffer 414. Integrator decoder 412 is comprised of gating means somewhat similar to those previously described with respect to FIG. 6, except in this latter embodiment the decoder provides a three line output rather than the two line output of the decoder of FIG. 6. Decoding occurs in accordance with the schedule illustrated in the table of FIG. 20, reference to which figure should now also be made. The integrator decoder 412 is structured so that when the accumulator output, that is, the weight of the number appearing simultaneously at the outputs of the shift registers 406 through 410 at the occurrence of a particular $f_o$ pulse, is between 0 and 3 the lines A, B and C, the input lines of the buffer, are at the 0 logical level. Should the accumulator output be between 4 and 5 then a logic 1 appears on line A and logic 0 at lines B and C of the buffer input lines. The remainder of the decoder logic is as shown in the first portion of the table of FIG. 20 and need not be repeated here.

As previously mentioned, simultaneously with the application of the $f_o$ pulses in the accumulator whereby the data therein is decoded, the $f_o$ pulses are applied to buffer 414 so that the decoded data at the buffer input lines A, B and C are applied respectively to the three independent shift registers of the buffer. The buffer thus stores data as it is transferred from the accumulator and decoder circuits. At some later point in time, to be described below, the buffer stored data is clocked out, processed through memory decoder 416 and switch 418, and then fed into a main memory. It should be noted that since the integrate decode period occurs during adjacent pulses of the $f_o/w$ signal, that exactly 128 pulses at the $f_o$ pulse repetition frequency are applied to accumulate 404 and buffer 414 during this period. Means for accomplishing this are assumed in gating means 405 and 415, and are somewhat similar to the means for performing a similar function in the earlier embodiment, it now being deemed obvious to one skilled in the art how to particularly implement these means.

It should also be noted that at the completion of the integrate decode period the accumulator 404, as previously mentioned, contains data equal to one half the weight of the data contained therein immediately prior to the period. During the next four PRF signals the resulting radar returns are added to the data remaining in accumulator 404. Thus, in essence, after the next four PRF signals there is contained in accumulator 404 data related to eight radar return signals. Thus, this realignment of elements has permitted the elimination of the eight word storage of the earlier embodiment resulting in economies of equipment.

Returning more particularly to FIG. 19, at line F thereof there is shown a pulse 425 which represents the transfer of data from buffer 414 to the main memory. This transfer of data from the buffer to the main memory occurs during the low portion of the PRF/4 signal seen at line A, while the integration period occurs during the high portion of the PRF/4 signal of line A. Again referring to FIG. 18, a gate means 420 is provided for controlling switch 418, in particular during the integrate period for maintaining switch 418 open so that the information is not entered into the main memory from the buffer, and during the transfer of data from the buffer to the main memory, that is, during the low portion of the PRF/4 signal, switch 418 is maintained closed so that information may enter from the buffer into the main memory. The time period during which the $f_o$ signal from gate means 415 are applied to the buffer in order to update the main memory is determined by means similar to those shown with respect to the earlier embodiment. Specifically, an azimuth memory counter practically identical to that previously described cumulates a count related to the antenna azimuth position. At the trailing edge of the PRF/4 signal the count instantaneously contained in the azimuth memory counter is entered into an azimuth locater which is then counted down by the $f_o/w$ signal. When the azimuth locator counts down to zero, gate means 420 closes switch 418 providing communication between buffer 14 and main memory through the memory decoder 416. Simultaneously, 128 $f_o$ pulses are provided through gate means 415 to buffer 414.

Memory decoder 416 is comprised of a number of gates also somewhat similar to that seen in FIG. 6 for processing the information issuing from buffer 414 and for considering the data to be displaced from the main memory which is supplied by lines FB1 and FB2, these constituting the feedback from the main memory of the data to be displaced by the information now issuing into the main memory from the memory decoder. It should be noted that the information which was previously entered into the buffer via buffer input lines A, B and C is now removed from the buffer in the same order in which it was previously stored therein so that the information previously seen on the buffer input lines A, B and C is now seen on the corresponding buffer output lines A, B and C between decoder 416 and buffer 414. Returning again to the table of FIG. 20, memory decoder 416 performs the logic operation contained in that table. For example, should there be a logic 0 instantaneously at each of the buffer output lines A, B and C and simultaneously FB1 and FB2 are at the 0 logic level then Data 1 and Data 2, the date being instantaneously delivered to the main memory, will also be at the logic 0 level. As another example, should output lines A and B between buffer 414 and decoder 416 be at a logic 1 level while line C is at the logic 0 level, Data 1 will be at the logic 1 level while Data 2 will be at the logic 0 level regardless of the logic levels of FB1 and FB2. The logic of the memory decoder is as seen in the table of FIG. 20 and need not be discussed further.

Refer now to FIG. 21 which shows the logic formulae for the operation of memory decoder 416. In these formulae the logic level of the output lines C, B and A are seen in that order. It is deemed that with these formulae the structure of a memory decoder to perform the logic becomes obvious to one skilled in the art.

Preferably, the main memory, output buffer, control signal generator and other elements of a practical display using the teachings of the latter embodiment will be similar to similar elements taught in the former embodiment. In an actual display built in accordance with the teachings of the latter embodiment, the pulse repetition frequency of the PRF signal and hence the radar transmissions, was twice the pulse repetition frequency of the PRF signals of a unit built in accordance with the former embodiment. Accordingly, the time to clock 16,384 bits through the circulating memories of both embodiments was the same. This means that in the latter embodiment, during the time that transfer from the buffer to the main memory can occur, the data in the main memory is completely circulated therethrough so that access to the update of the main memory can be at a single point in the main memory. It will be remembered that with respect to the earlier embodiment only half the data was circulated through the main memory in the period during which an update of the main memory could occur. In that case it was necessary to use a double access main memory as was explained at that time.

Also with respect to display built in accordance with the latter embodiment, in that case the azimuth memory counter counted only every other PRF signal so that consecutive adjacent radar returns were from the same azimuth. In the earlier embodiment this was not so, the azimuth memory counter counting each PRF so that each consecutive radar return was from consecutive azimuths. Of course, alterations and modifications such as those described above lie within the scope of this invention together with other alterations and modifications which will now be apparent to those skilled in the art. Accordingly, the invention is to be limited only by the scope and true spirit of the appended claims.

The invention claimed is:

1. A display device for a radar system wherein a train of first signals corresponding to radar transmissions is generated and which receives a sequence of radar return signals, said device including a master oscillator means for generating a plurality of coherent control signals, comprising:
   an analog to digital converter for converting each said radar return signal into at least first and second parallel binary words, each said word being comprised of a train of serial binary bits;
   a plurality of input means, each associated with an individual one of said binary words and each said input means having a capacity to store a predetermined number of binary bits;
   a main memory including a plurality of individual circulating memories, each associated with an individual one of said input means;
   first gate means responsive during a first period to said first signals for communicating each said binary word to its associated input means whereby said binary words are stored in a bit-by-bit manner, and for communicating each said input means to its associated circulating memory in response to said coherent control signals whereby a binary word previously stored in said input means is stored in said main memory;
   a plurality of output means, each associated with an individual one of said circulating memories;
   utilization means responsive to said coherent control signals for displaying binary data applied thereto; and
   second gate means responsive to said coherent control signals for communicating each said circulating memory to its associated output means whereby binary words stored in said circulating memories are stored in said output means, and for applying the binary words stored in said output means to said utilization means.

2. The display device of claim 1 wherein said input means comprises a plurality of binary shift registers each associated with an individual one of said binary words and wherein said predetermined number of binary bits is an integral multiple of a second predetermined number of binary bits, said first gate means being responsive to enter into each said input means said second predetermined number of bits in a serial by bit manner from each radar return signal.

3. The display device of claim 2 wherein the storage capacity of each said circulating memory is an integral number of said second predetermined number.

4. The display device of claim 3 wherein said master oscillator means includes means for generating first clock pulses at a first pulse repetition frequency, said first clock pulses being applied directly to said circulating memories to thereby circulate binary information stored therein at an information rate related to said first pulse repetition frequency, said first gate means being responsive to said coherent control signals to apply said first clock pulses to said input means whereby said binary words previously stored in said input means are stored into said circulating memories.

5. The display device of claim 4 wherein said first gate means includes means for generating a second train of clock pulses at a second pulse repetition frequency, said first gate means being responsive to said first signals for applying said second pulse train to said input means whereby said binary words are entered into said input means.

6. The display device of claim 5 wherein said first gate means includes means for terminating said first period after a number of second clock pulses have been applied to said input means, said number of second clock pulses being equal to said second predetermined number.

7. The display device of claim 6 wherein said second pulse repetition frequency is selectively variable.

8. The display device of claim 1 wherein said master oscillator means includes means for generating first clock pulses at a first pulse repetition frequency, said first clock pulses being applied continuously to said circulating memories whereby information stored therein is circulated at an information rate related to said first pulse repetition frequency, and wherein said second gate means is responsive to said coherent control signals for applying said first clock pulses to said output means whereby binary data is entered from said memory means into said output means.

9. The display device of claim 1 wherein each of said plurality of output means comprises first and second further memories, said second gate means being responsive to said coherent control signals for communicating the associated circulating memory with one of said further memories during a third period and for communicating the other of said further memories with said utilization means during said third period.

10. The display device of claim 9 wherein said second gate means responds further to said coherent control signals for communicating each said circulating memory with its associated second further memory during a fourth period and for communicating said first further memory with said utilization means during said fourth period.

11. The display device of claim 10 wherein said master oscillator means includes means for generating a third train of clock pulses at a third pulse repetition frequency, said third pulse repetition frequency being an integral multiple of said first pulse repetition frequency, and wherein said second gate means is responsive to said coherent control signals to apply said first clock pulses to one of said further memories when said further memory is communicating with its associated circulating memory and for applying said third clock pulses to said one of said further memories when that further memory is communicating with said utilization means.

12. The display device of claim 1 wherein said first signals are coherent with said coherent control signals.

13. The display device of claim 1 wherein said first signals are non-coherent with said coherent control signals.

14. A display device for a radar system wherein a train of first signals corresponding to radar transmissions is generated and which receives a sequence of radar return signals, comprising:
a master oscillator means for generating a plurality of coherent control signals;
means for converting each of said radar return signals into at least first and second parallel binary words, each said word being comprised of a train of serial binary bits;
binary input means for storing data related to said at least first and second parallel binary words;
circulating memory means for storing data related to data stored in said binary input means;
first means responsive during a first period to said first signals for communicating at least said first and second parallel binary words to said binary input means for storing said data related to said at least first and second parallel binary words therein, and for storing in said circulating memory means data related to the data stored in said binary input means in response to said coherent control signals;
output means;
utilization means responsive to said coherent control signals for displaying data applied thereto; and
second means responsive to said coherent control signals for storing data from said circulating memory means into said output means and for applying data from said output means to said utilization means.

15. The display device of claim 14 wherein said input means comprises means for integrating a plurality of said radar return signals.

16. The display device of claim 14 wherein said input means comprises means for integrating a plurality of said first and second parallel binary words.

17. The display device of claim 14 wherein said means for converting includes means for generating range clock pulses including means for selectively varying the pulse repetition frequency of said range clock pulses, said means for converting being responsive to said range clock pulses for converting said radar signals into said at least first and second binary words of a first predetermined number of bits each and at a rate related to the selected pulse repetition frequency of said range clock pulses.

18. The display device of claim 17 wherein said circulating memory means has a capacity of storing a second predetermined number of bits, said second predetermined number being an integral multiple of said first predetermined number.

19. The display device of claim 18 wherein said input means comprises means for integrating a plurality of said radar return signals.

20. The display device of claim 19 wherein said means for integrating comprises a plurality of shift registers each having the capacity to store the first predetermined number of bits.

21. The display means of claim 19 wherein said means for integrating comprises an adder for weighting and adding parallel binary words applied thereto, and means for accumulating the output from said adder, the integration being performed by applying at least first and second binary words as generated by said means for converting to said adder while simultaneously applying the contents of said means for accumulating to said adder in an ordered bit-by-bit fashion.

22. The display means of claim 21 wherein said binary input means comprises a buffer and decoder responsive to said coherent control signals during a second period for decoding the contents of said means for accumulating and for storing the results of the decoding into said buffer.

23. A display means for a radar system which receives a sequence of radar return signals, comprising:
a master oscillator means for generating a plurality of coherent control signals;
binary input means including means for converting each of said radar return signals into at least first and second parallel binary words descriptive of one of said radar return signals and for storing binary data related to said at least first and second parallel binary words;
memory means for storing data related to data in said binary input means;
first means responsive during the occurrence of each of said radar return signals for generating a first predetermined number of range clock pulses, said binary input means being responsive to said range clock pulses for said converting and said storing, said first means being additionally responsive to said coherent control signals for storing in an ordered fashion in said memory means data related to the data stored in said binary input means;
output means;
utilization means responsive to said coherent control signals for displaying data applied thereto; and
second means responsive to said coherent control signals for storing data from said memory means into said output means and for applying data from said output means to said utilization means.

24. The display means of claim 23 wherein the pulse repetition frequency of said range clock pulses is selectively variable.

25. The display means of claim 24 wherein said binary input means comprises means for integrating a plurality of said radar return signals.

26. The display means of claim 25 wherein said binary input means comprises a plurality of binary shift registers each having a bit storage capacity equal to said first predetermined number.

27. The display means of claim 26 wherein said memory stores a second predetermined number of data bits, said second predetermined number being an integral multiple of said first predetermined number.

28. The display means of claim 23 wherein said memory stores a second predetermined number of data bits, said second predetermined number being an integral multiple of said first predetermined number.

29. The display means of claim 28 wherein said utilization means comprises a cathode ray tube operating in a rho-theta mode and responsive to a first of said coherent control signals for initiating an azimuth sweep and responsive to a second of said coherent control signals for initiating a range sweep.

* * * * *